(12) United States Patent
Smith

(10) Patent No.: US 11,242,126 B2
(45) Date of Patent: Feb. 8, 2022

(54) NEUTRALLY BUOYANT VEHICLE MANEUVERING SYSTEM AND METHODS FOR SAME

(71) Applicant: Raven Industries, Inc., Sioux Falls, SD (US)

(72) Inventor: Michael Scott Smith, Sulphur Springs, TX (US)

(73) Assignee: Raven Industries, Inc., Sioux Falls, SD (US)

( * ) Notice: Subject to any disclaimer, the term of this patent is extended or adjusted under 35 U.S.C. 154(b) by 41 days.

(21) Appl. No.: 16/560,944

(22) Filed: Sep. 4, 2019

(65) Prior Publication Data

US 2020/0070945 A1 Mar. 5, 2020

Related U.S. Application Data

(60) Provisional application No. 62/726,646, filed on Sep. 4, 2018.

(51) Int. Cl.
*B64B 1/40* (2006.01)
*B64B 1/70* (2006.01)

(52) U.S. Cl.
CPC . *B64B 1/70* (2013.01); *B64B 1/40* (2013.01)

(58) Field of Classification Search
CPC .... B64B 1/30; B64B 1/32; B64B 1/34; B64B 1/40; B64B 1/70
See application file for complete search history.

(56) References Cited

U.S. PATENT DOCUMENTS

| 6,425,552 B1 * | 7/2002 | Lee .......................... B64B 1/60 244/97 |
| 8,820,678 B2 | 9/2014 | Devaul et al. |
| 8,967,533 B2 | 3/2015 | Devaul et al. |

(Continued)

FOREIGN PATENT DOCUMENTS

| WO | WO-2014011384 A1 | 1/2014 |
| WO | WO-2014031375 A1 | 2/2014 |

OTHER PUBLICATIONS

"International Application Serial No. PCT/US2019/049597, International Search Report dated Feb. 5, 2020", 4 pgs.

(Continued)

*Primary Examiner* — Philip J Bonzell
*Assistant Examiner* — Tye William Abell
(74) *Attorney, Agent, or Firm* — Schwegman Lundberg & Woessner, P.A.

(57) ABSTRACT

A towed atmospheric balloon system includes an atmospheric balloon including a quantity of lift gas and a neutral buoyancy towing system coupled with the atmospheric balloon. The neutral buoyancy towing system includes one or more towing thrusters configured to move the towed atmospheric balloon system in a neutrally buoyant condition between altitudes, and a power source operatively coupled with the towing thruster. Wherein a composite mass of the towed atmospheric balloon system includes component masses of the atmospheric balloon and the neutral buoyancy towing system, and the composite mass is static and neutral buoyancy is maintained with movement between altitudes. At differing altitudes the composite mass of the towed atmospheric balloon system is static and the system remains neutrally buoyant.

29 Claims, 15 Drawing Sheets

(56) References Cited

U.S. PATENT DOCUMENTS

| | | | |
|---|---|---|---|
| 9,033,274 B2 | 5/2015 | Devaui et al. | |
| 9,329,600 B2 | 5/2016 | Devaul et al. | |
| 9,340,272 B1* | 5/2016 | DeVaul | B64B 1/62 |
| 2003/0236070 A1* | 12/2003 | Seligsohn | H04B 7/18504 |
| | | | 455/12.1 |
| 2004/0065773 A1* | 4/2004 | Morales | A01G 15/00 |
| | | | 244/30 |
| 2005/0173591 A1* | 8/2005 | Colting | B64B 1/32 |
| | | | 244/26 |
| 2007/0069077 A1* | 3/2007 | Colting | B64B 1/30 |
| | | | 244/128 |
| 2007/0102571 A1* | 5/2007 | Colting | B64B 1/06 |
| | | | 244/30 |
| 2009/0152391 A1* | 6/2009 | McWhirk | B64B 1/02 |
| | | | 244/30 |
| 2013/0175391 A1* | 7/2013 | DeVaul | B64B 1/44 |
| | | | 244/96 |
| 2014/0014769 A1* | 1/2014 | DeVaul | B64B 1/62 |
| | | | 244/97 |
| 2014/0319271 A1* | 10/2014 | DeVaul | B64B 1/44 |
| | | | 244/97 |
| 2015/0021427 A1* | 1/2015 | Heppe | B64B 1/06 |
| | | | 244/2 |
| 2015/0168955 A1* | 6/2015 | DeVaul | H02S 20/30 |
| | | | 701/10 |
| 2017/0331177 A1* | 11/2017 | MacCallum | B64B 1/40 |

OTHER PUBLICATIONS

"International Application Serial No. PCT/US2019/049597, Written Opinion dated Feb. 5, 2020", 8 pgs.

"International Application Serial No. PCT/US2019/049597, Invitation to Pay Additional Fees dated Nov. 4, 2019", 2 pgs.

"2016 Senior Capstone Project / Luxury Airship", YouTube® Video, Time: 01:06. [online]. Retrieved from the Internet: <URL: https://www.youtube.com/watch?v=KCUC5Jw4Vfg>, (video contained on CD Diskette), (Apr. 22, 2016).

"2016 Senior Capstone Project / Luxury Airship", YouTube Video, Time: 01:06. [online], Retrieved from the Internet: <URL: https://www.youtube.com/watch?v=KCUC5Jw4Vfg>, (Apr. 22, 2016).

De Piolenc, F. Marc, "Altitude Control of Free Balloons—a Survey", Airshipworld Journal, incororating Aerostation, No. 51, (Mar. 2002), 1-17.

Paciorek, Clay, "Iowa State Now Receiving Applications for Boeing Senior Design Project", [online], [retrieved on Aug. 21, 2019], Retrieved from the Internet: <URL: https://www.aere.iastate.edu/blog/2016/05/05/iowa-state-now-receiving-applications-for-boeing-senior-design-project/>, (May 5, 2016), 6 pgs.

* cited by examiner

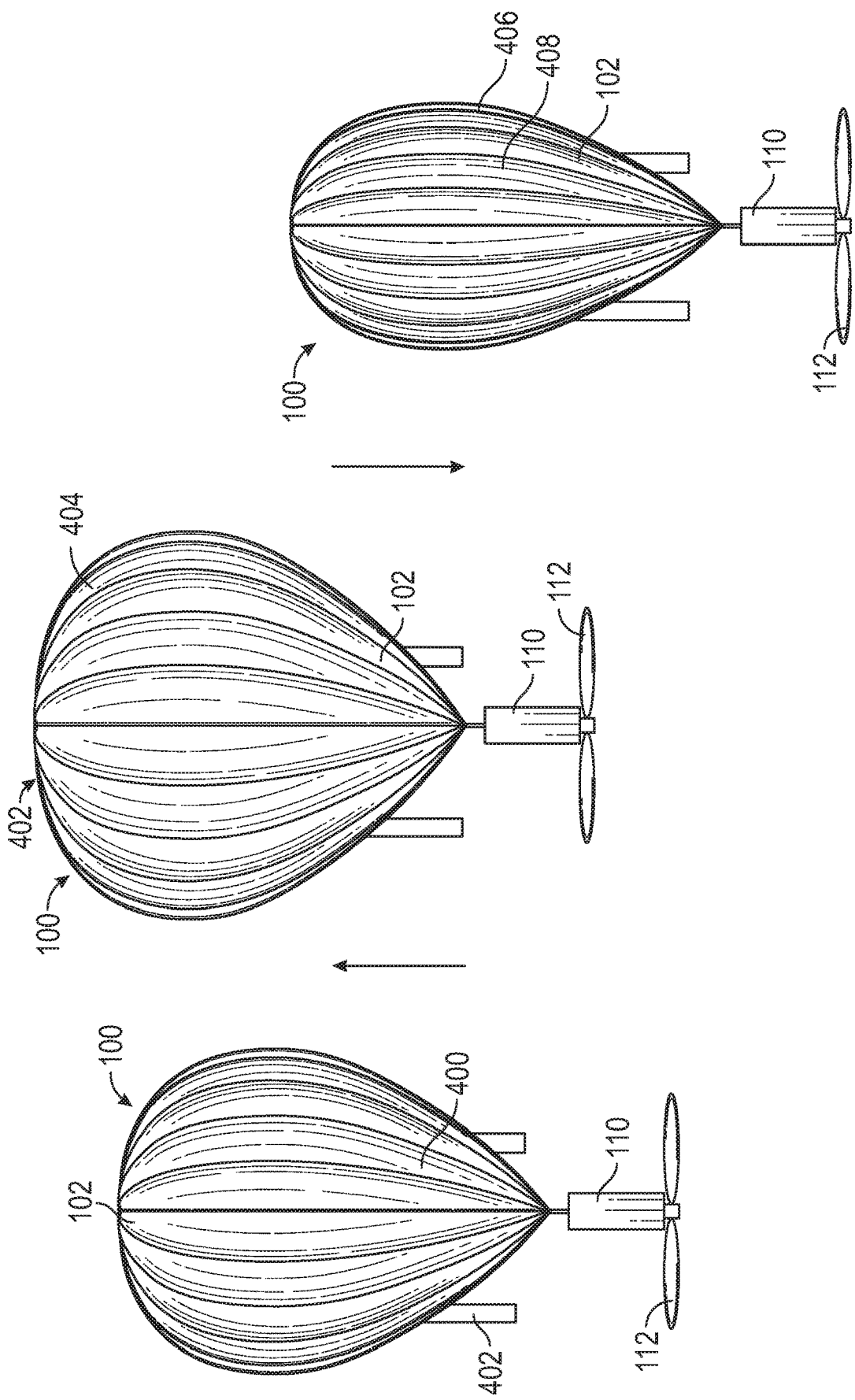

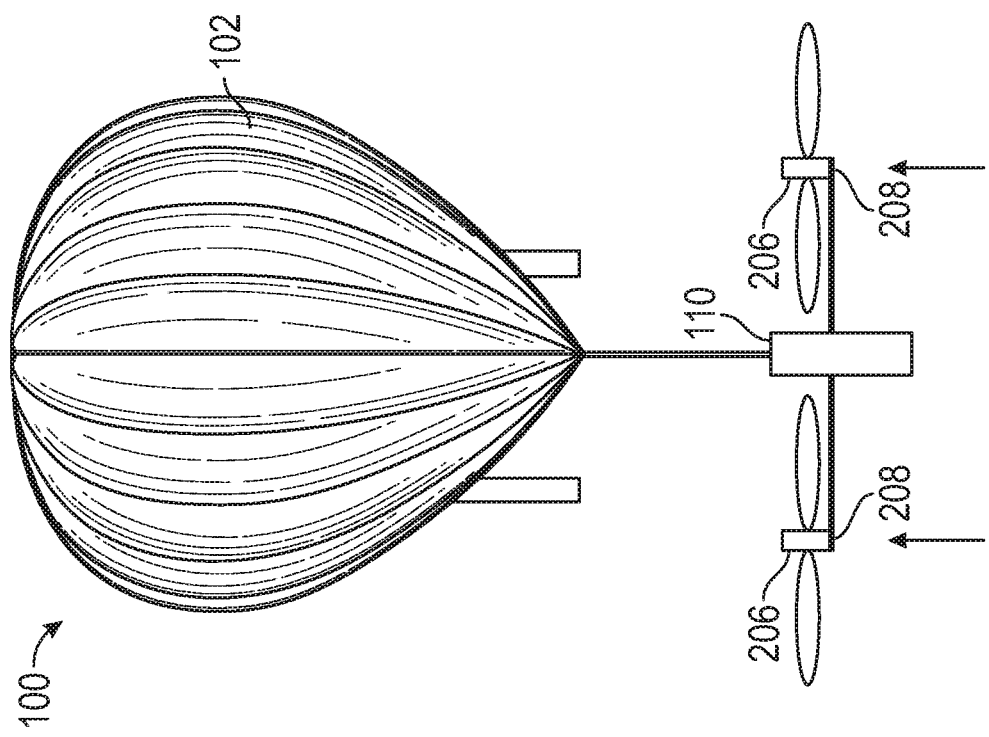
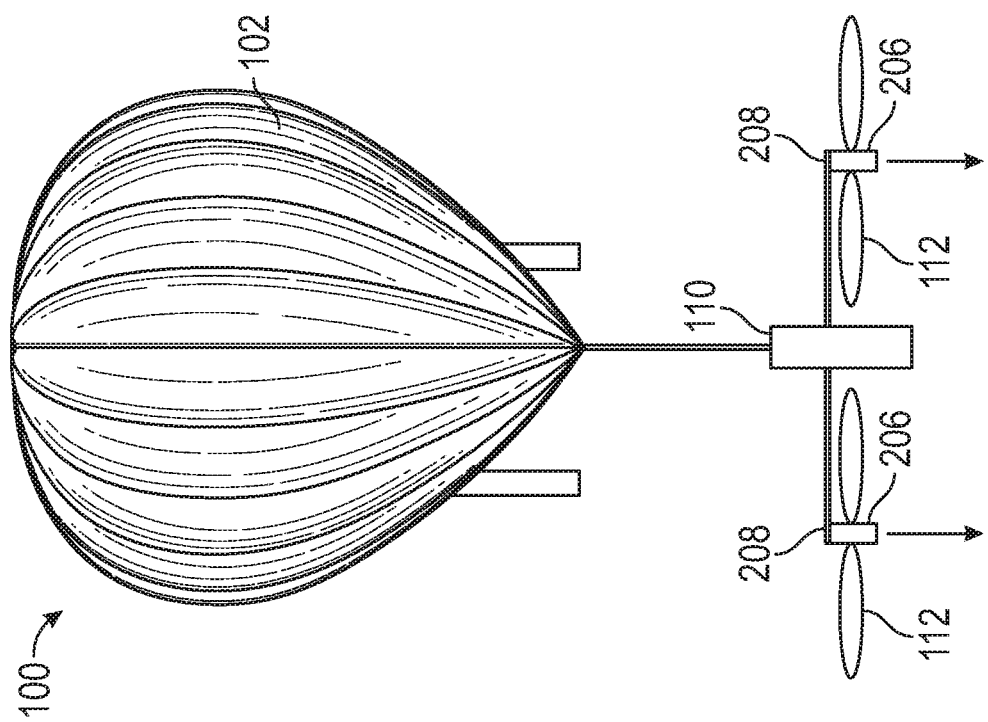
FIG. 7C

1000

1002 POSITIONING THE ATMOSPHERIC BALLOON SYSTEM AT AN INITIAL ALTITUDE, THE ATMOSPHERIC BALLOON SYSTEM INCLUDES AN ATMOSPHERIC BALLOON HAVING:

- A QUANTITY OF LIFT GAS
- A DYNAMIC BALLOON VOLUME

1004 TOWING THE ATMOSPHERIC BALLOON SYSTEM WITH A NEUTRAL BUOYANCY TOWING SYSTEM INCLUDING AT LEAST ONE TOWING THRUSTER, TOWING INCLUDES

1006 DRIVING THE ATMOSPHERIC BALLOON SYSTEM FROM A FIRST ALTITUDE TO A SECOND ALTITUDE WITH A FORCE FROM THE AT LEAST ONE TOWING THRUSTER, THE FIRST ALTITUDE DIFFERENT FROM THE SECOND ALTITUDE

1008 CHANGING THE DYNAMIC BALLOON VOLUME WHILE DRIVING FROM THE FIRST ALTITUDE TO THE SECOND ALTITUDE

1010 MAINTAINING NEUTRAL BUOYANCY OF THE ATMOSPHERIC BALLOON SYSTEM WHILE DRIVING FROM THE FIRST ALTITUDE TO THE SECOND ALTITUDE

1012 MAINTAINING A STATIC COMPOSITE MASS OF THE ATMOSPHERIC BALLOON SYSTEM WHILE DRIVING FROM THE FIRST ALTITUDE TO THE SECOND ALTITUDE

FIG. 10

NEUTRALLY BUOYANT VEHICLE MANEUVERING SYSTEM AND METHODS FOR SAME

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raven industries, Inc.; Sioux Falls, S. Dak., USA. All Rights Reserved.

TECHNICAL FIELD

This document pertains generally, but not by way of limitation, to maneuvering systems for neutrally buoyant vehicles.

BACKGROUND

Atmospheric balloons are used for scientific, telecommunication and broadband applications. The balloons are filled with a lift gas and maintained at one or more altitudes through precise control of ballast (e.g., one or more of addition or subtraction of mass). In examples atmospheric balloons include zero pressure balloon systems and super pressure balloon systems.

Super pressure balloon systems maintain a constant balloon volume. Super pressure balloons experience positive buoyancy and, without ballast control, rise to an altitude based on the full (constant) volume of the balloon and the lift gas within the balloon. In some examples, super pressure balloon systems use ballonets as ballast systems, for instance interior or exterior ballonets, that are pressurized with atmosphere forced into the ballonet. A blower, pump or the like delivers and pressurizes the atmosphere in the ballonet. The pressurized atmosphere has a higher density and corresponding mass than the surrounding ambient atmosphere, and accordingly increases the composite mass of the super pressure balloon system (additive ballast) and decreases its altitude. Conversely, in order to increase altitude, the heavier pressurized atmosphere in the ballonet is evacuated through vents, reversed pumping or blowing, or the like (subtractive ballast) to decrease the composite mass of the system.

In another example, atmospheric balloons include zero pressure balloon systems that use dynamic volume balloons, in contrast to the constant volume balloons of super pressure balloon systems. Extra lift gas is added to initiate a launch and positive ascent. When the zero pressure balloon reaches a specified volume, the extra lift gas is passively vented until the system reaches an equilibrium altitude. At night, the lift gas cools and compresses and ballast is discarded (subtractive ballast) to account for the decreased buoyancy. In examples, zero pressure balloon systems include onboard ballast systems that drop steel or glass shot from reservoirs on the system (e.g., attached to a payload) to decrease the composite mass of the system and maintain altitude. Conversely, during the day the lift gas warms and expands, thereby increasing the buoyancy of the zero pressure balloon system. To counteract an ascent because of increased buoyancy lift gas is passively vented until the ascent is arrested.

OVERVIEW

The present inventors have recognized, among other things, that a problem to be solved can include increasing operational lifetimes of atmospheric balloon systems (e.g., balloons, aerostats, blimps, airships or the like including an inflatable bladder) while at the same time minimizing payload allocations for ballast systems. As previously described, super pressure balloon systems include ballast systems having ballonets (internal or external), blowers and power sources to deliver and pressurize ambient atmosphere to increase a composite mass of the system and thereby reduce the buoyancy in the balloon system. Further, zero pressure balloon systems include ballast systems that discard mass from the balloon system (e.g., glass or steel shot) to offset negative buoyancy. In each of these examples the balloon systems change the composite mass of the respective systems with various ballast systems that add or subtract mass to achieve neutral buoyancy. In other examples, the ballast systems are used to change buoyancy (e.g., from neutral to positive or neutral to negative) by changing the mass of the systems to adjust the altitude of the balloons systems until a specified altitude is attained, and then further change the mass to achieve neutral buoyancy for maintenance at the specified altitude.

Further, ballast systems including motors, blowers, batteries, balloons, steel or glass shot reservoirs or the like assume weight and space otherwise used by payload components including, but not limited to, instruments, telecommunication systems, broadband systems or the like. In some examples, ballast systems including motors, batteries, shot reservoirs or the like assume ten percent or more of the available payload capacity for a balloon system. Further, because ballast systems operate with finite resources (e.g., battery power, shot reservoirs or the like) and a limited quantity of lift gas (vented in some examples to offset positive buoyancy or because of leaks), the operational lifetimes of these balloon systems are limited.

The present subject matter provides a solution to this problem with a towed atmospheric balloon system having a neutral buoyancy towing system. The atmospheric balloon includes a quantity of lift gas, and in some examples the quantity of lift gas remains substantially constant during operation (e.g., with minimal or no change to the mass of the lift gas quantity). Instead, the atmospheric balloon includes a dynamic volume that increases and decreases with ascent and descent, respectively, while the composite mass of the towed atmospheric balloon system remains constant during operation. The towed atmospheric balloon system thereby maintains a neutral buoyancy by offsetting a corresponding volume and mass of ambient atmosphere. The neutral buoyancy, towing system includes one or more towing thrusters that drive the neutrally buoyant towed atmospheric balloon system. For instance, the one or more towing thrusters of the towing system apply a force to the towed atmospheric balloon system to move the system between altitudes, laterally or the like. A thruster for the neutral buoyancy towing system, as described herein, includes, but is not limited to, a rotor, propeller, ducted fan (collectively rotors); flapping wings (in the manner of an ornithopter); ion thrusters (air breathing, copper ejection mass or the like); electric propulsion systems or the like.

Because the towed atmospheric balloon system is neutrally buoyant the power needed (batteries, motor output and the like) and mass for one or more towing thrusters is substantially minimized relative to one or more of the power requirements or mass of other ballast systems. In effect, the one or more towing thrusters of the neutral buoyancy towing system are configured to apply sufficient force to control the movement of a weightless (e.g., neutrally buoyant) system, for instance to move the system between altitudes, laterally, maintain position or the like. Power otherwise used to counterbalance positive or negative buoyancy is accordingly minimized (e.g., eliminated or decreased). Additionally, the one or more towing thrusters are operated in ambient atmosphere and do not need additional power (including larger motors, batteries or the like) otherwise used with ballast systems having blowers that pressurize atmosphere for a ballonet. Accordingly, additional payload capacity, previously used with ballast systems, is freed for one or more of instruments, telecommunication systems, broadband systems or the like.

Additionally, because the composite mass of the towed atmospheric balloon system remains constant (e.g., with incidental losses because of leaking or venting because of increased temperatures) the balloon systems described herein are operable for significant periods including, but not limited to, operational lifetimes of 200 days, 300 days, 400 days and in some examples indefinitely. For instance, the operational lifetimes of the towed atmospheric balloon systems are not limited by ballast systems (e.g., batteries, shot reservoirs, venting of lift gas or the like) having finite resources. Further still, because the example neutral buoyancy towing systems described herein are not subject to finite resources (e.g., shot, power requirements or the like) in the manner of previous ballast systems and the balloon system is maintained in a neutrally buoyant configuration the balloon system is operable over a large range of altitudes including, but not limited 30.000 feet to 130,000 feet or more. In one example, the upper altitude limit of the example towed atmospheric balloon systems is determined by the maximum volume of the atmospheric balloon.

This overview is intended to provide an overview of subject matter of the present patent application. It is not intended to provide an exclusive or exhaustive explanation of the disclosure. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 4A is a first schematic view of the neutrally buoyant atmospheric balloon system of FIG. 1 at an initial altitude with an initial volume.

FIG. 4B is a second schematic view of the neutrally buoyant atmospheric balloon system of FIG. 1 towed to a first altitude with a first volume.

FIG. 4C is a third schematic view of the neutrally buoyant atmospheric balloon system of FIG. 1 towed to a second altitude with a second volume.

FIG. 7C is a schematic diagram of a towing system including a plurality of reversibly orienting rotors.

FIG. 10 is a block diagram showing one example of a method for towing an atmospheric balloon system.

DETAILED DESCRIPTION

Figure 1:
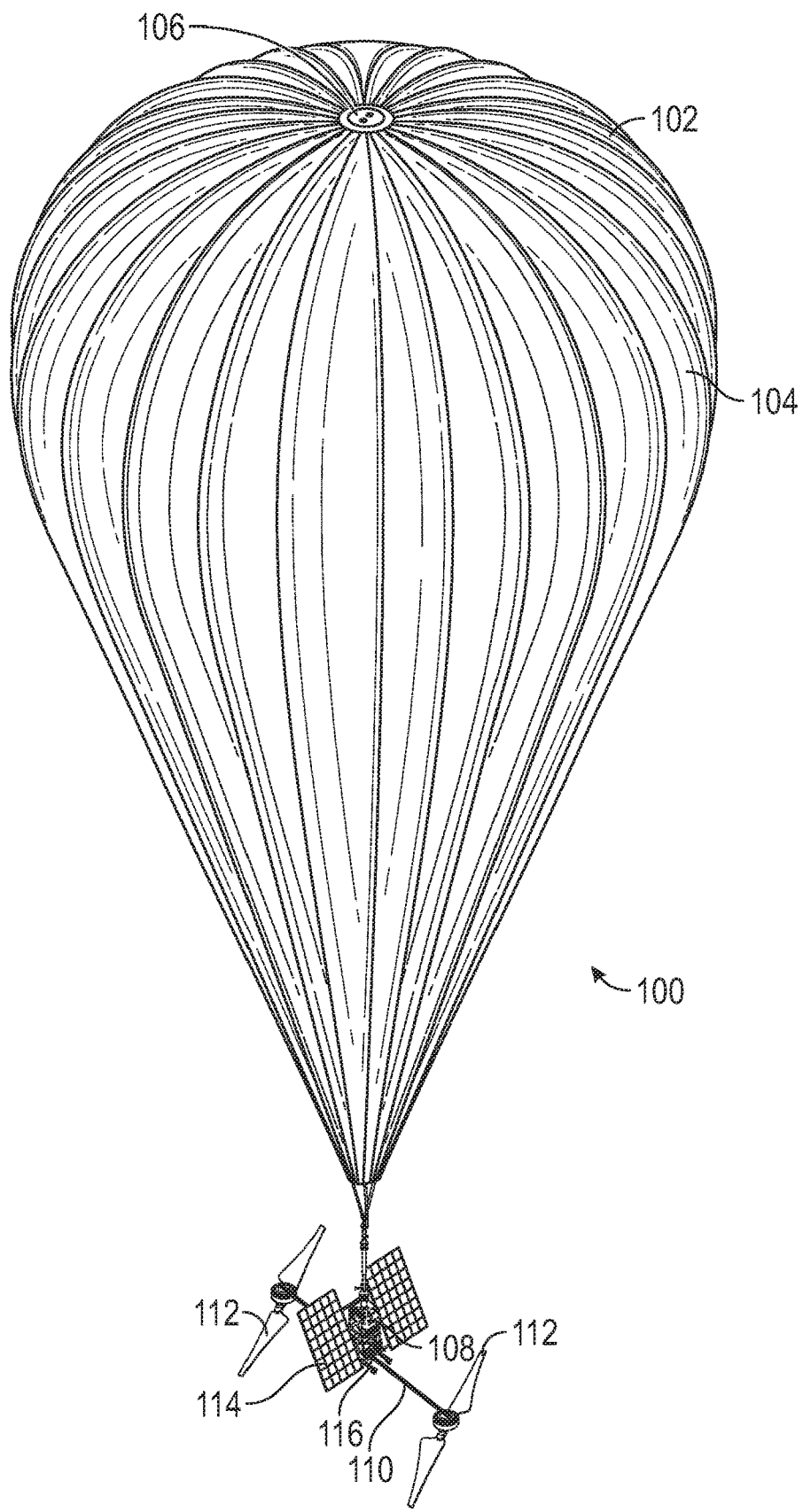
FIG. 1 is a perspective view of one example of a neutrally buoyant atmospheric balloon system including a towing system.

FIG. 1 is a perspective view of one example of a towed atmospheric balloon system 100. The towed atmospheric balloon system 100 includes an atmospheric balloon 102 having a dynamic volume. As described herein, the dynamic volume of the atmospheric balloon 102 is used in combination with a neutral buoyancy towing system, such as the system 110 shown in FIG. 1, to tow the neutrally buoyant towed atmospheric balloon system 100 between altitudes, laterally or the like.

Figure 2:
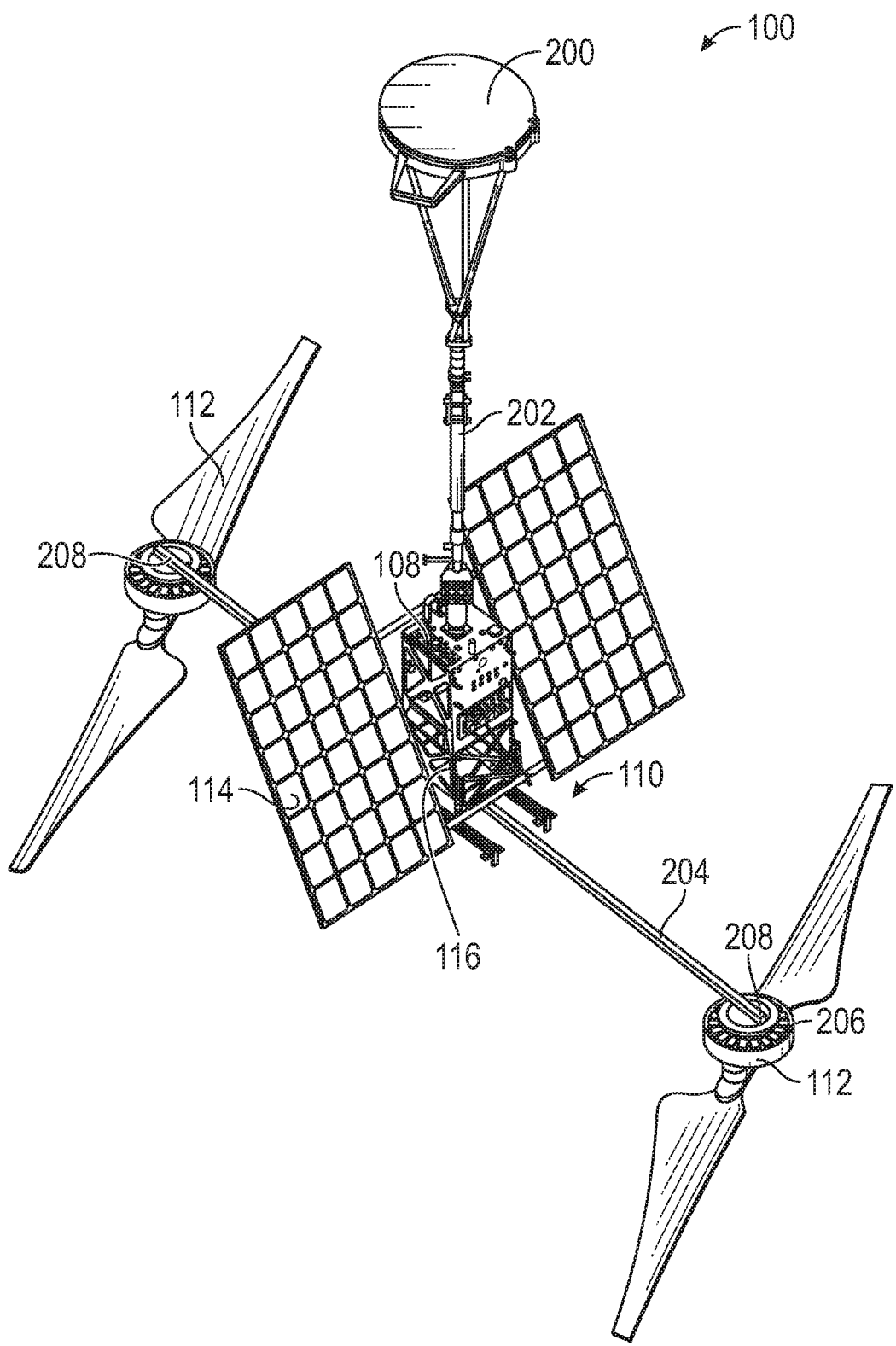
FIG. 2 is a detailed perspective view of the example towing system shown in FIG. 1.

As further shown in FIG. 1, the atmospheric balloon 102 includes a balloon membrane 104 extending between an upper balloon apex 106 and, as shown in FIG. 2, a lower balloon apex 200. As described herein, the atmospheric balloon 102 includes, but is not limited to, systems having an inflatable bladder such as atmospheric balloons, aerostats, blimps, airships or the like.

As further shown in FIG. 1, the towed atmospheric balloon system 100, in this example, includes a payload 108 suspended from the atmospheric balloon 102. The payload 108 includes a neutral buoyancy towing system 110. As shown in FIG. 1, the neutral buoyancy towing system 110 includes one or more towing thrusters 112 including the rotors shown in FIG. 1. Other examples of towing thrusters 112 include, but are not limited to, rotors such as propellers, ducted fans (collectively referred to as rotors); flapping wings (in the manner of an ornithopter); ion thrusters such as air breathing or copper election mass thrusters (configured to eject a negligible or incidental mass relative to the overall static mass of the system 100), electric propulsion systems or the like.

The neutral buoyancy towing system 110 further includes, in this example, a towing system operation module 116 in communication with each of the towing thrusters 112 as well as one or more other systems of the payload 108 including, for instance, a receiver, transceiver, telecommunications devices or the like. The towing system operation module 116 operates the one or more towing thrusters 112 in combination with the neutrally buoyant towed atmospheric balloon system 100 to accordingly move the system 100 between altitudes, laterally, rotate the system or the like. The neutral buoyancy towing system 110 further includes a power source 114. As shown in FIG. 1, one example of the power source 114 includes photoelectric cells. In another example, the power source 114 includes one or more of batteries, wind turbines or the like configured to generate power for one or more systems of the towed atmospheric balloon system 100 including, for instance, the towing thrusters 112.

In operation, the towed atmospheric balloon system 100 is maintained in a neutrally buoyant configuration, for instance, with a dynamic volume less than a total maximum volume of the atmospheric balloon 102. With the atmospheric balloon 102 in a less than full volume the lift gas within the atmospheric balloon 102 offsets the static mass of the balloon system including, for instance, the balloon membrane 104 as well as the associated weight or mass of the payload 108 including the neutral buoyancy towing system 110. At launch, lift gas is supplied to the atmospheric balloon 102 through one or more valves, ports or the like to partially fill a lift gas chamber of the balloon membrane 104. The atmospheric balloon 102 ascends to a specified altitude, for instance, an initial altitude of operation for the towed atmospheric balloon system 100. The system 100, in one example, vents excess lift gas to achieve neutral buoyance and accordingly maintain the initial altitude. In another example, the lift gas introduced to the balloon membrane 104 is sufficient to raise the towed atmospheric balloon system 100 to the initial altitude without venting of lift gas from the system 100. At this initial altitude, the composite mass of the towed atmospheric balloon system 100 is, in one example, static (for instance, including negligible or incidental leaks of lift gas or the like while otherwise remaining static).

At the initial altitude, the towed atmospheric balloon system 100, as previously described, is neutrally buoyant, for instance, the balloon membrane 104 has a less than full volume and accordingly is configured to change altitude to higher and lower elevations. The neutral buoyancy towing system 110 is operated, for instance, by way of the towing system operation module 116 and the associated one or more towing thrusters 112 to drive the towed atmospheric balloon system 100 between altitudes, laterally, rotate the balloon system or the like. Because the towed atmospheric balloon system 100 is neutrally buoyant, and thereby effectively weightless, the neutral buoyancy towing system 110 readily drives the system 100. Accordingly, one or more of negative buoyancy, positive buoyancy or the like are not counterbalanced by additional thrusts, forces or the like provided by the towing thrusters 112. Instead, the towed atmospheric balloon system 100 is effectively weightless and accordingly the towing thrusters 112 provide driving or towing forces to the towed atmospheric balloon system 100 to overcome mass based inertia of the system and readily move the system 100 between various altitudes, laterally or the like.

In combination with movement provided by the neutral buoyancy towing system 110, the balloon membrane 104 of the atmospheric balloon 102 changes volume according to changes in altitude. In one example, ascent of the towed atmospheric balloon system. 1.00 to a higher altitude includes corresponding expansion of the atmospheric balloon 102 to a larger volume. The lift gas within the balloon membrane 104 expands thereby increasing the volume of the atmospheric balloon 102 and the corresponding mass of the displaced atmosphere continues to match the composite static mass of the towed atmospheric balloon system 100 thereby maintaining neutral buoyancy. Conversely, in another example, with descent of the towed atmospheric balloon system 100, the towing thrusters 112 are operated to move the neutrally buoyant balloon system 100 to the lower altitude. As the system 100 descends, the atmospheric balloon 102 shrinks, for instance, as the lift gas within the balloon membrane 104 is compressed by the surrounding more dense atmosphere. The displaced atmosphere has a lesser volume but greater density and accordingly a corresponding mass to the composite mass of the towed atmospheric balloon system 100. The towed atmospheric balloon system 100 thereby retains neutral buoyancy.

Accordingly, the towing thrusters 112, whether moving the towed atmospheric balloon system 100 between altitudes, laterally (e.g., north, south or the like), rotating the system or the like, moves the system 100 having neutral buoyancy. As described herein, the neutral buoyancy towing system 110 in combination with the neutrally buoyant towed atmospheric balloon system 100 provides a low power directional control system for the balloon system 100 in comparison to other control systems and the associated ballast systems.

FIG. 2 shows a detailed perspective view of one example of the payload 108 previously shown in FIG. 1. The payload 108 is, in this example, suspended from a lower balloon apex 200, for instance, by a suspension cable 202. The payload 108 shown in FIG. 2 corresponds to a gondola, suspended framework or the like deployed from or suspended below one or more atmospheric balloons such as the atmospheric balloon 102, shown in FIG. 1, as well as one or more other examples of balloons described herein including, but not limited to, aerostats, blimps, airships or the like.

In the example shown in FIG. 2, the payload 108 includes the neutral buoyancy towing system 110 previously described herein. The neutral buoyancy towing system 110 includes one or more towing thrusters 112. In this example, the towing system 110 includes two towing thrusters 112 deployed along corresponding thruster booms 204. As shown, the towing thrusters 112 in FIG. 2 include rotors extending from motors 206 associated with each of the towing thrusters 112. In another example, the towing thrusters 112 include one or more articulating joints 208 configured to orient the towing thruster 112 relative to the position shown in FIG. 2. For instance, the towing system operation module 116 actuates the articulating joints 208 to direct the towing thrusters 112 along one or more axes to accordingly move the towed atmospheric balloon system 100, for instance between varying altitudes, laterally, rotate the system 100 combinations of the same or the like.

In another example, the motors 206 associated with the towing thrusters 112 are operated at one or more speeds directions or the like (e.g., including reverse directions) to facilitate elevation changes. In an example, rotation and counter rotation of the rotors of the towing thrusters 112 cause ascent or descent, respectively, of the neutrally buoyant balloon system 100. In other examples, the articulating joints 208 are actuated to rotate one or more of the towing thrusters 112 to orient the towing thrusters 112 and thereby facilitate the elevation change of the towed atmospheric balloon system 100 while maintaining a consistent rotation direction. For example, the rotors of the towing thrusters 112 are oriented 180 degrees relative to the orientation shown in FIG. 2, rotated in a consistent direction (though now inverted) to initiate elevation changes in an opposite direction, for instance to initiate descent instead of ascent. In another example, rotation and counter-rotation are paired with operation of the articulating joints 208 to provide additional flexibility of control. For instance the motor 206 rotates the rotors of the towing thrusters at one or more speeds and with rotation or counter rotation in combination with orienting of the towing thrusters 112 with the articulating joints 208 to provide various towing forces (e.g., magnitudes and directions) to the towed atmospheric balloon system 100.

Referring again to FIG. 2, the payload 108, in one example, includes the towing system operation module 116. In other examples, a power source such as the photoelectric cells shown in FIG. 2 is included with the payload 108 to power one or more systems of the towed atmospheric balloon system 100 including, but not limited to, the neutral buoyancy towing system 110. In other examples, the payload 108 includes one or more additional components including, but not limited to, instrumentation, communication devices, telecommunication equipment, broadband equipment or the like. As will be described herein, the inclusion of a neutral buoyancy towing system 110 along with a neutrally buoyant towed atmospheric balloon system 100 facilitates the enhancement or increase of payload capabilities of the associated towed atmospheric balloon system 100. In one example, mass otherwise dedicated to more powerful and accordingly heavier ballast systems is instead devoted to increased payload capacity for the towed atmospheric balloon system 100. Because the system 100 is neutrally buoyant, each of the thrusters 112, the power source 114, as well as associated other components of propulsion systems for the towed atmospheric balloon system 100 are optionally sized smaller than in balloon systems using ballast systems to modulate buoyancy. For instance, the towed atmospheric balloon system 100 is weightless (e.g., has neutral buoyancy) and accordingly movement of the towed atmospheric balloon system 100 is facilitated without the need for heavier or more powerful ballast systems that otherwise counterbalance or initiate positive or negative buoyancy.

Figure 3A:
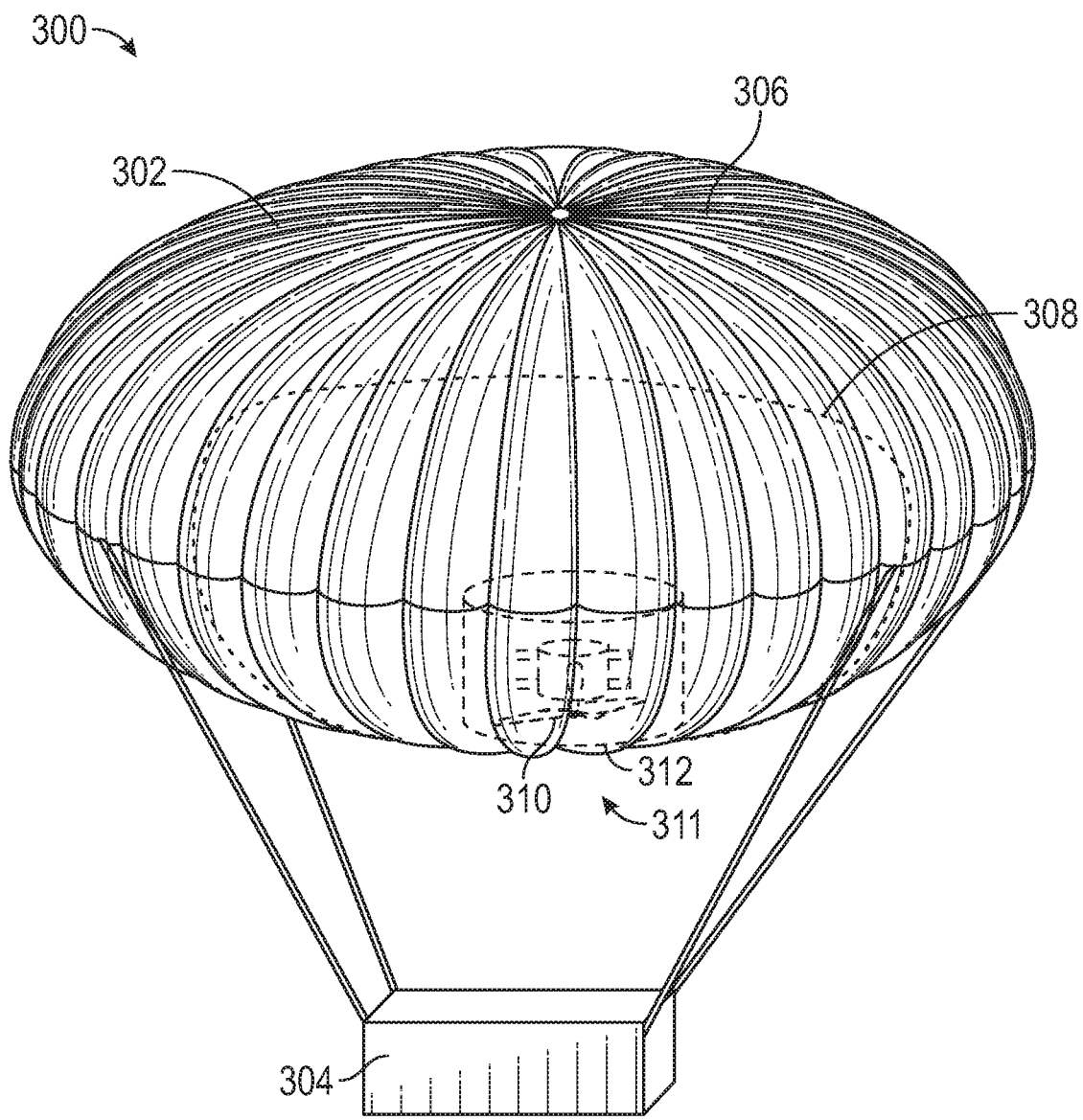
FIG. 3A is a schematic view of one example of a super pressure balloon system including a ballonet type ballast system.
Figure 3B:
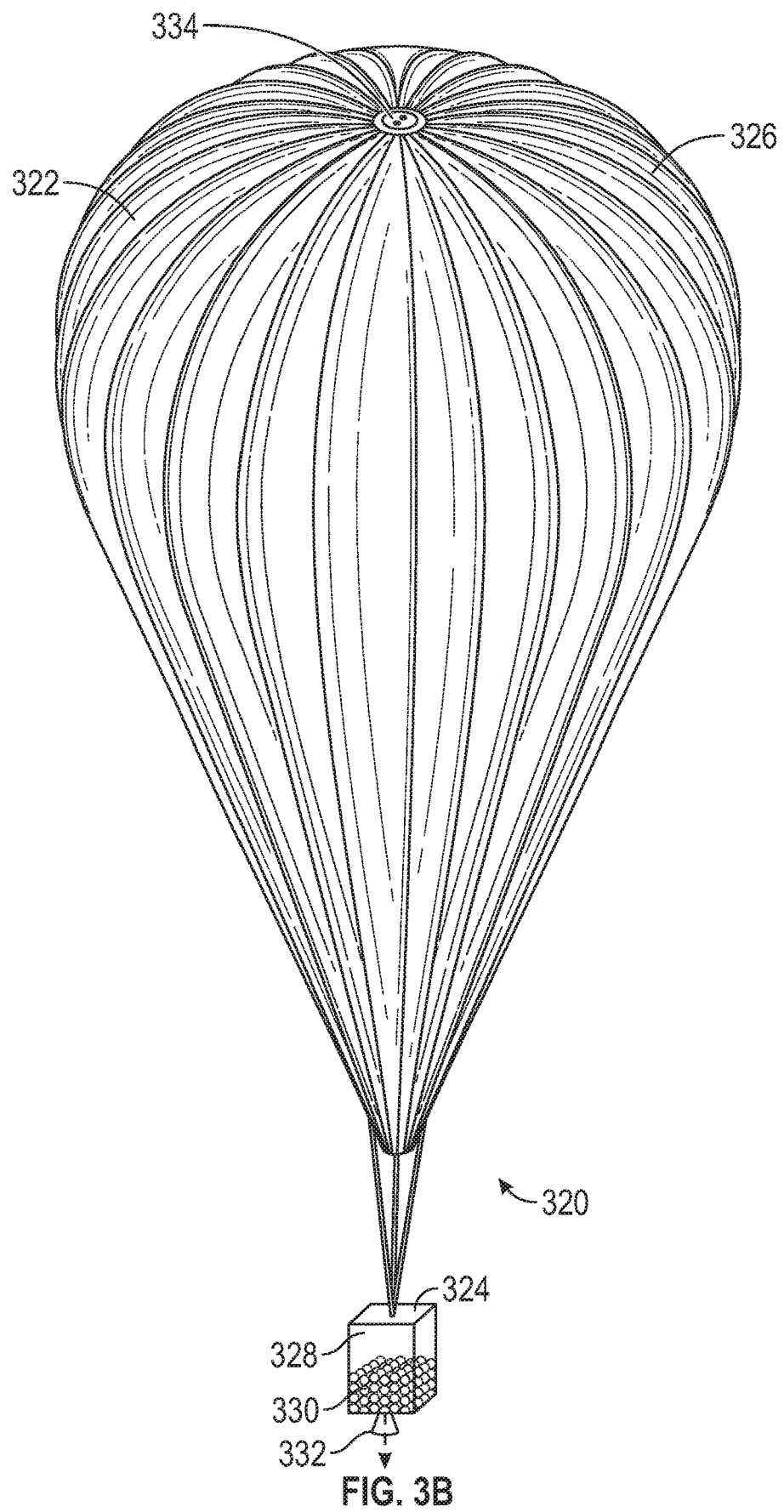
FIG. 3B is a schematic view of one example of a zero pressure balloon system including a subtractive ballast system.

FIGS. 3A and 3B show example balloon systems including ballast systems configured to add or subtract mass from the systems to accordingly facilitate one or more of altitude changes, arrest altitude changes or the like. Referring first to FIG. 3A, one example of a super pressure balloon system 300 is shown including a super pressure balloon 302. The super pressure balloon 302 includes a balloon membrane having a lift gas chamber 306 therein. The lift gas chamber 306 is provided within the super pressure balloon 302 and the super pressure balloon including the lift gas chamber 306 (and the ballonet 308) has a constant volume. In one example, the super pressure balloon 302 has a pumpkin type shape corresponding to a plurality of gores coupled together along their seams and extending between upper and lower apexes of the super pressure balloon 302. While fully inflated the super pressure balloon 302 is controlled (e.g., moved, ascended or descended) with operation of the balloon 308. As further show in FIG. 3A, a payload 304 is suspended from the balloon 302.

As further shown in FIG. 3A, the super pressure balloon 302 includes ballonet 308 as well as the lift gas chamber 306. As described herein, the ballonet 308 is one component of a ballast system. The ballast system in this example includes the ballonet 308, a blower 310 and one or more of a vent 312 or other components configured to increase and decrease the composite mass of the super pressure balloon system 300 to facilitate altitude changes, arrest altitude changes or the like.

In operation, the super pressure balloon 302 is deployed in the atmosphere. At an initial altitude, the super pressure balloon 302 has a constant volume and maintains the constant volume throughout operation, for instance, between one or more altitude changes, lateral shifts or the like of the super pressure balloon 302. When an altitude change is desired the ballast system is operated to change the size of the ballonet 308 and the corresponding composite mass of the super pressure balloon system 300. For instance, to achieve a lower altitude relative to the initial altitude of the super pressure balloon system 300, the blower 310 shown in FIG. 3A is operated to deliver atmospheric gas such as air into the ballonet 308. The air is heavier relative to the lift gas within the lift gas chamber 306. As the ballonet 308 expands the mass of the system 300 correspondingly increases as the lift gas chamber 306 volume shrinks relative to the ballonet 308 volume (while the overall volume remains static). The corresponding increase in mass of the super pressure balloon system 300 thereby makes the system 300 negatively buoyant and the system 300 descends. At the lower altitude, the blower 310 or vent 312 are operated to vent or evacuate atmosphere from the ballonet 308 thereby contracting the ballonet 308 while conversely expanding the lift gas chamber 306 (and decreasing the system 300 composite mass). Upon achieving neutral buoyancy, the descent of the super pressure balloon system 300 is arrested.

In contrast, when an increase in altitude for the super pressure balloon system 300 is specified the ballonet 308 is evacuated, for instance, by the blower 310 or through the vent 312. A decreased volume of the ballonet 308 facilitates the expansion of the lift gas chamber 306 again with the super pressure balloon 302 remaining at the overall volume shown in FIG. 3A. The evacuation of air from the ballonet 308 decreases the mass of the super pressure balloon system 300 thereby achieving positive buoyancy of the system 300 and accordingly initiating ascent of the system 300 to a higher altitude. Upon reaching the specified higher altitude, the blower 310 or vent 312 are operated to fill the ballonet 308 with atmospheric gas to increase the composite mass of the system 300 and correspondingly decreasing the volume of the lift gas chamber 306 to achieve neutral buoyancy.

Accordingly, with the super pressure balloon system 300 and the ballast system including the blower 310, altitude changes of the system 300 are initiated and controlled by way of changes in mass in the super pressure balloon system 300. The blower 310 delivers pressurized atmosphere into the ballonet 308 and accordingly expands the ballonet 308 while diminishing the volume of the lift gas chamber 306. The overall composite volume of the super pressure balloon 302 remains the same while the composite mass of the balloon system 300 increases to lower the super pressure balloon system 300 to a specified altitude. Conversely, a decrease in mass of the super pressure balloon system 300 is achieved with evacuation of the ballonet 308 that initiates an upward altitude change of the balloon system 300. Each of these altitude changes corresponds to operation of the ballast system and a change in composite mass of the system 300. The blower 310 is sufficiently powerful to deliver pressurized atmospheric gas into the ballonet 308 and accordingly overcome the counterbalancing pressure within the lift gas chamber 306.

Accordingly, the blower 310 is, in various examples, sized, for instance, to include a corresponding motor, fan, power supply, control system or the like configured to pressurize atmospheric gas for delivery into the ballonet 308. In contrast to the towing thrusters 112, shown in FIG. 2 and further described herein, the blower 310 of the super pressure balloon system 300 is accordingly configured to pressurize gas as opposed to providing propulsion, such as towing. Because the blower 310 is configured to pressurize gas, it generally has higher power requirements, a larger motor or the like that accordingly contribute to the overall mass of the super pressure balloon system 300 and thereby minimize or decrease the payload capabilities for the system 300, for instance, as it relates to the payload 304.

FIG. 3B shows another example of a balloon system, a zero pressure balloon system 320, having a dynamic (variable) volume. The zero pressure balloon 322 includes a lift gas chamber 326 including a quantity of lift gas therein. The lift gas is introduced to the chamber 326, for instance at launch, and the quantity (mass) of lift gas within the lift gas chamber 326 optionally stays constant. As further shown in FIG. 3B, the zero pressure balloon system 320 includes a payload 324. In one example, the payload 324 includes another example of a ballast system 328 including, for instance, a ballast supply 330 (e.g., a ballast reservoir). In one example, the ballast supply 330 includes, but is not limited to, a quantity of glass or steel shot configured to provide counterbalancing ballast to the positive buoyancy otherwise provided by the zero pressure balloon 322 including the lift gas therein. As shown in FIG. 3B, the ballast system 328 includes a ballast discharge port 332 in selective communication with the ballast supply 330. As described herein, the ballast discharge port 332 allows for the measured discharge of the ballast supply 330 to accordingly maintain neutral buoyancy or, in some examples, provide positive buoyancy to thereby trigger ascent of the zero pressure balloon 322.

Referring again to FIG. 3B, in operation, the zero pressure balloon 322 is configured to increase its buoyancy (thereby achieving a positive buoyancy) through the discharge of mass from the zero pressure balloon system 320. For instance, the ballast system 328 is operated by way of opening the ballast discharge port 332 to discharge a quantity of the ballast supply 330. The discharge of ballast through the ballast discharge port 332 decreases the overall mass of the zero pressure balloon system 320 thereby making the buoyancy of the zero pressure balloon system 320 positive and facilitating an ascent of the zero pressure balloon system 320 to a specified height. Upon reaching the specified greater altitude, in one example, the zero pressure balloon 322 is opened, for instance, with a vent, port or the like to facilitate the exhaust of a quantity of lift gas from the lift gas chamber 326 to counterbalance the positive buoyancy and achieve neutral buoyancy of the zero pressure balloon system 320. The exhausting of lift gas from the lift gas chamber 326 is another example of a mass change of the zero pressure balloon system 320.

Conversely, where descent of the zero pressure balloon system 302 is specified, in one example, lift gas is vented from the lift gas chamber 326 to initiate a decrease in buoyancy and corresponding decrease in elevation of the zero pressure balloon system 320. Upon reaching a specified lower altitude the ballast system 328 is operated to discharge a quantity of the ballast supply 330 through the ballast discharge port 332 to achieve neutral buoyancy and arrest further descent of the zero pressure balloon system 320.

Additionally, the ballast system 328 is operated to change the mass of the zero pressure balloon system 320 according to changes caused by temperature shifts, day/night cycles or the like. For instance, during the day as the zero pressure balloon 322 is heated the lift gas chamber 326 expands and changes the buoyancy of the zero pressure balloon system 320 toward an overall positive buoyancy. Accordingly, the zero pressure balloon system 320 rises, for instance, above a specified altitude. In one example, the lift gas chamber 326 is opened to vent a portion of the lift gas to achieve neutral buoyancy. Accordingly, as the zero pressure balloon system 320 begins to ascend, in one example, the lift gas is partially exhausted, for instance, by way of an operable vent to release a portion of the lift gas and arrest further ascent of the zero pressure balloon system 320.

In contrast, for instance, during cooling of the zero pressure balloon system 320, for instance after sundown, the volume of the zero pressure balloon 322 decreases. As the volume of the lift gas decreases, the altitude of the zero pressure balloon system 320 decreases because of negative buoyancy until the mass of the zero pressure balloon system 320 is offset by a corresponding displaced mass of the surrounding atmosphere. In one example, the ballast system 328 is operated to counterbalance the negative buoyancy. For example, a quantity of the ballast supply 330 is discharged through the ballast discharge port. 332 to decrease the composite mass of the zero pressure balloon system 320 and prevent or arrest further descent of the system 320. In various examples, this process of temperature and day and night based changes to the volume of the zero pressure balloon 322 are offset by operation of the ballast system 328 as well as venting of the lift gas from the lift gas chamber 326. Accordingly, the mass of the zero pressure balloon system 320 is actively changed from day-to-day and with variations of temperature to offset these buoyancy changes caused by these environmental conditions.

In each of the examples shown in FIGS. 3A and 3B, the composite mass of the super pressure balloon system 300 and the zero pressure balloon system 320 are changed. In the example of FIG. 3A, a blower 310 pressurizes gas to the ballonet 308, such as atmospheric gas, to change mass and buoyancy of the super pressure balloon 302 and thereby initiate ascent or descent of the super pressure balloon system 300. Conversely, the zero pressure balloon system 320 uses a ballast system 328 as well as venting of lift gas from the zero pressure balloon 322 to change the composite mass and initiate or offset buoyancy changes of the zero pressure balloon system 320.

In the example including the zero pressure balloon system 320, the ballast system 328 includes a quantity of ballast supply 330 such as steel shot, glass shot or the like, that is exhausted over the operational lifetime of the zero pressure balloon 322. After exhaustion of the ballast system 328, the zero pressure balloon system 320 is, in one example, decommissioned, for instance, by way of opening of the vent of the lift gas chamber 326 to end the operation of zero pressure balloon system 320. In the example including the super pressure balloon system 300 of FIG. 3A, the blower 310 is operated, for instance, with a corresponding motor, fan, controls or the like to provide a system configured to pressurize gas for delivery to the ballonet 308. As previously described, these components of the blower 310 and its associated ballast system 311 enhance the overall weight or mass of the super pressure balloon system 300 and thereby decrease the payload 304 otherwise available for one or more of instrumentation, communication devices, telecommunication devices, broadband devices or the like.

As will be described herein, the composite static mass of the towed atmospheric balloon system 100 described herein is comparatively static relative to the other balloon systems having various ballast systems (e.g., ballonet, ballast reservoir or the like). Further, the towed atmospheric balloon system 100 maintains neutral buoyancy through dynamic volume changes of the atmospheric balloon 102. With the neutral buoyancy towing system 110 described herein, the atmospheric balloon 102 and the associated payload 108 are readily moved between altitudes without mass changes thereby enhancing the overall operational lifetime of the balloon system 100 relative to balloon systems including exhaustible ballast systems. At the same time, the neutral buoyancy towing system uses components, such as the towing thrusters 112, power sources 114 such as photoelectric cells or the like having a minimized mass compared to a blower 310 and other more robust equipment associated with the ballast system 311 of super pressure balloon systems 300. Accordingly, the towed atmospheric balloon system 100 includes less mass devoted to the neutral buoyancy towing system 110 compared to the blower 310 of the super pressure balloon system 300 thereby freeing additional mass of the balloon system 100 for use as the payload 108.

FIGS. 4A, 4B and 4C show various examples of the towed atmospheric balloon system 100 at a variety of altitudes. Each of the altitudes corresponds to a volume, for instance, the example initial volume 400, example increased volume 404 and example decreased volumes 408 in each of FIGS. 4A, 4B and 4C. Referring first to FIG. 4A, the towed atmospheric balloon system 100, including the atmospheric balloon 102, is shown at an initial balloon volume 400 corresponding to an initial altitude for deployment of the towed atmospheric balloon system 100. For instance, the atmospheric balloon 102 is filled with a lift gas and deployed to an initial altitude and correspondingly includes an example initial balloon volume 400. As further shown in FIG. 4A, the system 100 includes the neutral buoyancy system 110 suspended below the atmospheric balloon 102 with a towing thruster 112. In other examples, the neutral buoyancy towing system 110 includes additional or different towing thrusters 110, for instance, a plurality of towing thrusters, as shown in FIGS. 1 and 2, or other types of towing thrusters such as ion thrusters, electrically operated propulsion devices or the like.

As further shown in FIG. 4A, the towed atmospheric balloon system 100 optionally includes one or more operational vents 402 used during initial deployment of the system 100. In one example, the atmospheric balloon 102 is filled with extra lift gas (beyond an operating quantity or mass of lift gas) to accelerate the ascent of the atmospheric balloon 102 to the initial specified altitude. Upon reaching the specified altitude, the vent 402 is opened to exhaust excess lift gas otherwise used to achieve the initial altitude. After operation of the vents 402, in one example the quantity of lift gas within the atmospheric balloon 102 remains constant throughout the remainder of the operational lifetime of the towed atmospheric balloon system 100 having neutral buoyancy (e.g., the composite mass of the system 100 remains static).

Referring now to FIG. 4B, the towed atmospheric balloon system 100 is shown at an example greater altitude 402 relative to the position shown in FIG. 4A. As further shown in this figure, the atmospheric balloon 102 has an increased volume 404 relative to the initial balloon volume 400 shown in FIG. 4A. The neutral buoyancy towing system 110 is operated to provide thrust and drive the neutrally buoyant towed atmospheric balloon system 100 to the greater altitude 402. As the atmospheric balloon 102 is driven to the greater altitude 402, the lift gas within the atmospheric balloon 102 expands to the increased volume 404 shown in FIG. 4B. After achieving the specified altitude, the initial buoyancy towing system 110 ceases operation of the towing thrusters 112. Because the atmospheric balloon 102 has expanded in volume, an increased volume of air is displaced by the expanded atmospheric balloon. The corresponding displaced volume of (of less dense) air corresponds to the composite static mass of the towed atmospheric balloon system 100 and thereby maintains neutral buoyancy of the system 100 from the initial position shown in FIG. 4A to the second position shown in FIG. 4B corresponding to the greater altitude 402.

As shown in FIG. 4C, the towed atmospheric balloon system 100 is at a lower altitude relative to the positions shown in FIGS. 4A and 4B. Accordingly, the atmospheric balloon 102 has a smaller volume relative to the balloon volumes shown in FIGS. 4A and 4B. In this example, the towing thruster 112 of the neutral buoyancy towing system 110 provides thrust and tows the towed atmospheric balloon system 100 to the example decreased altitude 406. As the atmospheric balloon 102 descends, the increased density of the surrounding atmosphere compresses the atmospheric balloon 102 and decreases the volume of the atmospheric balloon to the example decreased volume 408. The decreased volume 408 of the atmospheric balloon 102 displaces a smaller corresponding volume of atmosphere. However, the smaller volume of displaced atmosphere has a mass corresponding to the composite static mass of the towed atmospheric balloon system 100 again maintaining the neutral buoyancy of the system 100 when moved between altitudes, for instance, the altitudes shown in FIGS. 4A and 4B. Upon reaching the lower decreased altitude 406, the towing thruster 112 ceases operation and the neutrally buoyant towed atmospheric balloon system 100 remains at the decreased altitude 406 until further towing is specified (e.g., to a different altitude, laterally for propulsion or the like).

As shown in FIGS. 4A, 4B and 4C, the towing thruster 112 of the neutral buoyancy towing system 110 is operated to initiate and (with its cessation of operation) arrest changes in altitude or position of the towed atmospheric balloon system 100. Accordingly, the towing thruster 112 is, in one example, operated where change in altitude is specified. Additionally, because the towed atmospheric balloon system 100 has a static composite mass and is neutrally buoyant, the towing thruster 112 is operated to provide a pushing or pulling force to the neutrally buoyant system 100 in contrast to countering, in other examples, positively or negatively buoyant systems. Accordingly, the towing thruster 112 of the neutral buoyancy towing system 110 has, in one example, lower power requirements for driving or towing of the neutrally buoyant system 100 relative to other negative or positively buoyant systems. Accordingly, robust batteries, motors for blowers or the like in other balloon systems are not required for the towed atmospheric balloon system 100.

Figure 5:
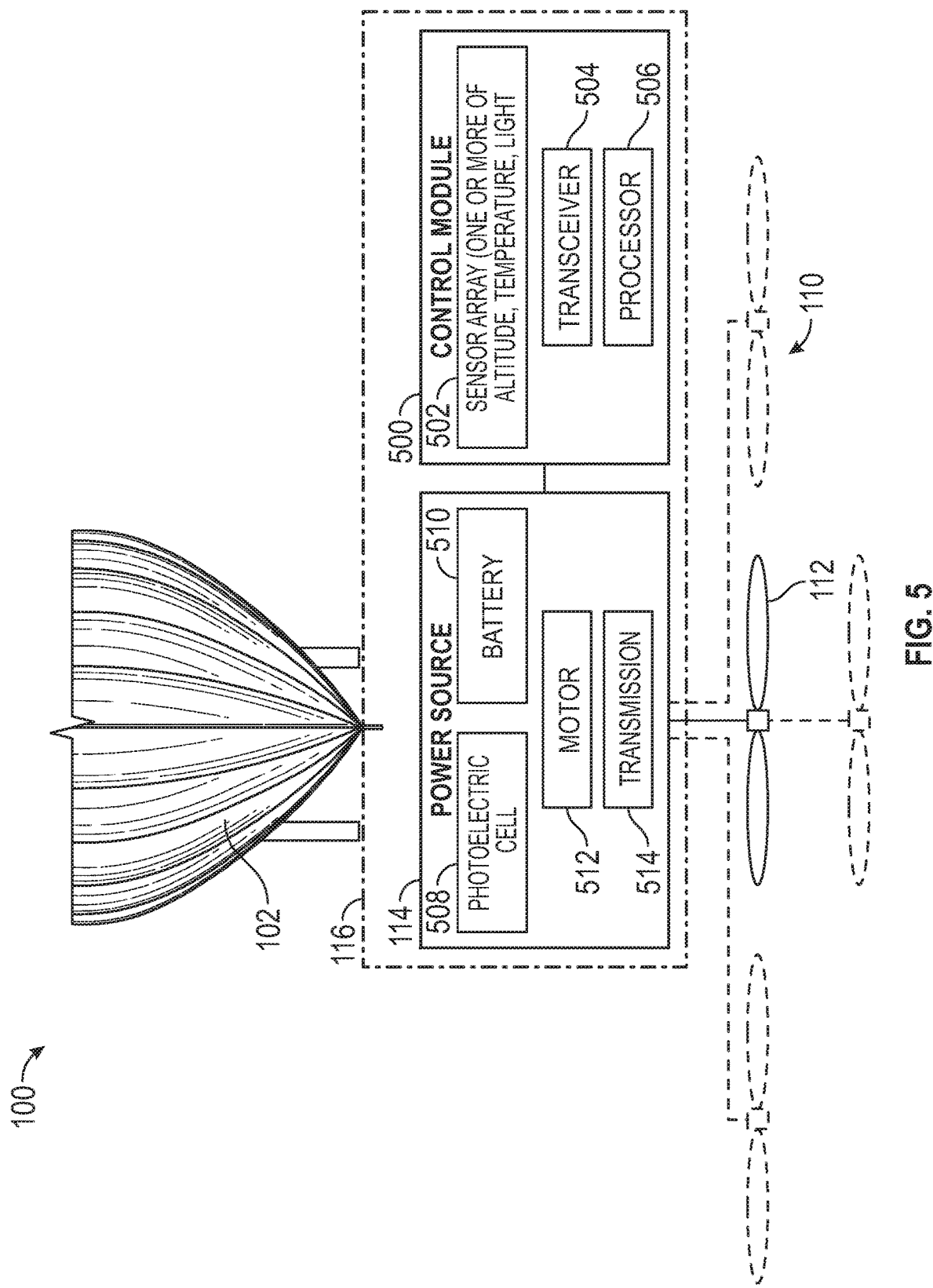
FIG. 5 is a schematic diagram of a towing system.

FIG. 5 is a schematic example of the towed atmospheric balloon system 100 previously described herein. As shown, the towed atmospheric balloon system 100 includes an atmospheric balloon, such as the balloon 102 shown in FIG. 1. Additionally, the system 100 includes a payload 108 having a neutral buoyancy towing system 110. As shown in FIG. 1, the neutral buoyancy, towing system 110 includes a plurality of towing thrusters 112. In the example of a system 100 shown in FIG. 5, the system 100 includes one or more towing thrusters 112. In one example, a plurality of towing thrusters 112 are provided in an axially aligned configuration, for instance, with the lower rotor shown in dashed lines relative to the upper rotor shown in solid lines. In still other examples, a plurality of towing thrusters 112 are provided in a lateral configuration, for instance, to the left and right in FIG. 5 to provide one or more of elevation changes, rotation of the system 100 as well as lateral movement of the system (as described herein).

As further shown in FIG. 5, the neutral buoyancy towing system 110 includes a towing system operation module 116. In the example shown in FIG. 5, the towing system operation module 116 includes a power source 114 and a control module 500. The power source 114 includes one or more of a photoelectric cell 508, battery 510, combinations of the same or the like. As further shown in FIG. 5, the power source 114 optionally includes a motor 512 in communication with each of the towing thrusters 112. In other examples, the towing thrusters 112 include one or more separate thrusters including, but not limited to, ion thrusters, other electrical propulsion devices or the like. Accordingly, the motor 512, in those examples, is not included. Referring again to FIG. 5, the motor 512 is optionally coupled with the towing thrusters 112 with a transmission 514. In one example, for instance, with a plurality of towing thrusters 112, the transmission 514 includes gears, belts, shafts or the like configured to transmit power to one or more of the associated towing thrusters 112. In another example, the transmission 514 includes a gearbox configured to step up or step down the rotation otherwise provided by the motor 512 to the towing thrusters 512 (e.g., rotors associated with the towing thrusters 112).

Referring again to FIG. 5, the control module 500 is shown in communication with the power source 114 of the towing system operation module 116. The control module 500 is in communication with the towing thrusters 112 and accordingly controls operation to drive the neutrally buoyant balloon system 100 between altitudes, laterally (e.g., along a specified heading) or the like. As shown in FIG. 5, the control module 500, in this example, includes a sensor array 502 having one or more sensors configured to facilitate the operation of the neutral buoyancy towing system 110. The sensor array 502 includes, in various examples, one or more of an altimeter, thermometer, light sensor or the like. In other examples, the sensor array 502 includes a global positioning system (GPS) system or other position or heading detecting system or the like.

As further shown in FIG. 5, the control module 500 includes a transceiver 504 including one or more of a radio transceiver, broadband receiver or the like configured to receive and transmit instructions, status updates or the like to and from the towed atmospheric balloon system 100 to a ground station, control node, supplemental balloon system in a network of balloons or the like associated with the towed atmospheric balloon system 100. As further shown in FIG. 5, the control module 500 further includes a processer 506. The processor 506 includes one or more of a program logic controller (PLC), computer processor, hardwired control unit or the like configured to operate the towing system operation module 116 and the one or more associated towing thrusters 112 of the neutral buoyancy towing system 110.

In one example, the control module 500 receives or implements onboard altitude, guidance instructions or the like including, for instance, a specified altitude, specified heading or the like. In an example including a specified altitude, the control module 500 compares the specified altitude with an altimeter reading from the sensor array 502 and through feedback control operates the towing thrusters 112 until the specified altitude is reached. For example, the towing thrusters 112 are operated to change the altitude of the towed atmospheric (neutrally buoyant) balloon system 100 to a specified altitude (including increased and decreased relative altitudes). For instance, the towing thrusters 112 are, in one example, operated to provide a towing force to the towed atmospheric balloon system 100 that accordingly drives the neutrally buoyant system to a specified higher altitude. In another example, the towing thrusters 112 are operated in reverse, for instance, to provide a downward towing force to the neutrally buoyant system 100 to thereby drive the neutrally buoyant system 100 to a specified lower altitude.

Once the reading from the altimeter of the sensor array 502 matches the specified altitude received by way of the transceiver 504 or provided by an onboard instruction set or operation scheme, further operation of the towing thrusters 112 is arrested. Because the towed atmospheric balloon system 100 is neutrally buoyant, upon cessation of the application of thrust, towing or the like to the system 100, the towed atmospheric balloon system 100 remains at the specified altitude (until additional altitude instructions are received, additional altitude changes are implemented for an operation scheme, environmental conditions such as wind move the system or the like).

In another example, the transceiver 504 receives or the processor 506 implements heading instructions, for instance, corresponding to a vector including speed and direction. In this example, the towing thrusters 112 are operated (e.g., articulated, directed or the like) to move the towed atmospheric balloon system 100 laterally. Optionally, the towing thrusters 112 are operated to provide both lateral and elevation changes to the towed atmospheric balloon system 100. As previously described herein, because the towed atmospheric balloon system 100 retains neutral buoyancy throughout operation, the towing thrusters 112 accordingly apply force to the mass of the towed atmospheric balloon system 100 that is otherwise weightless. Accordingly, force is applied by the towing thrusters 112 to the towed atmospheric balloon system 100 to provide immediate changes in direction, elevation or the like without otherwise having to address counterbalancing a positive or negative buoyancy.

In other examples, the towing thrusters 112 are operated by the control module 500 to change the altitude of the towed atmospheric balloon system 100, for instance, between one or more locations in the atmosphere that have differing wind directions. In this example, the towing thrusters 112 change the altitude of the system 100 while otherwise not directly moving the system 100 in a lateral fashion. Instead, the towing thrusters 112 move the towed atmospheric balloon system 100 to various altitudes having specified wind directions configured to move the towed atmospheric balloon system 100 along a desired heading, at a desired speed or the like.

In other examples, the sensor array 502 of the control module 500 includes other sensors, for instance, one or more of temperature sensors, light sensors or the like configured to measure one or more of daylight, ambient temperature around the towed atmospheric balloon system 100 or the like. In one example, the temperature sensors of the sensor array 502 are used in combination with the remainder of the control module 500 to measure one or more elevations in temperature (or conversely decreases in temperature) around the towed atmospheric balloon system 100. For instance, during the day light incident upon the towed atmospheric balloon system 100 heats the balloon 102, and the heated balloon 102 heats the atmosphere around the balloon and generates a thermal envelope. In some examples, the thermal envelope heats and expands the lift gas and artificially changes the buoyancy of the towed atmospheric balloon system 100. In a converse manner, for instance, from a day to night change, the atmosphere cools while the atmospheric balloon 102, in one example, remains heated. In this example, the atmospheric balloon 102 may provide its own thermal envelope that artificially increases buoyancy to the towed atmospheric balloon system 100 in the cooler night atmosphere.

In one example, the control module 500 of the neutral buoyancy towing system 110 addresses the artificial change in buoyancy by operating the towing thrusters 112 and driving the towed atmospheric balloon system 100 out of the thermal envelope. In this manner, the neutral buoyancy towing system 110, in one example, operates to maintain neutral buoyancy of the towed atmospheric balloon system 100. In other examples, one or more of temperature sensors or light sensors are operated in combination with the neutral buoyancy towing system 110 to preemptively address changes to neutral buoyancy otherwise caused by temperature changes, light incident on the atmospheric balloon 102 (or lack of light in the evening) or the like.

Figure 6A:
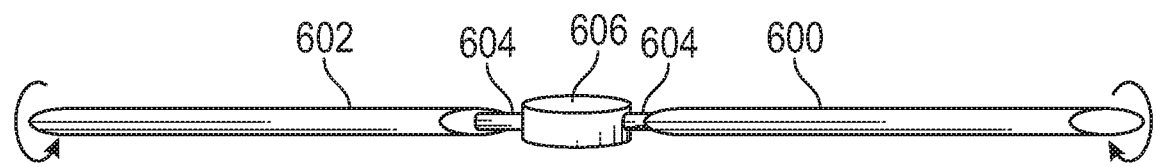
FIG. 6A is a perspective view of one example of a towing thruster.

FIGS. 6A-D show various examples of towing thrusters previously described herein. Although a plurality of towing thrusters are shown in FIGS. 6A-D, other examples of towing thrusters are, in various examples, used with the neutral buoyancy towing system 110 described herein. Referring first to FIG. 6A, one example of a towing thruster 600, in this example, includes one or more articulating rotors. As shown, the towing thruster 600 includes a shaft 606 configured to rotate around a central axis. A plurality of articulating rotor blades 602 (two rotor blades 602 in this example) extend from the shaft 606, for instance from intervening blade hubs 604. The intervening blade hubs 604 are configured to rotate or articulate the rotor blades 602 relative to the shaft. 606 and thereby provide alternating lift characteristics to the towing thruster 600. For instance, in one example, the shaft 606 and the associated motor is a unidirectional motor and thereby rotates the rotor blades 602 in a clockwise or counterclockwise direction. By articulating the blades with the blade hub 604 one or both of increases and decreases in altitude are accomplished with the unidirectional towing thruster 600. In other examples including unidirectional rotational movement, bidirectional rotational movement or the like, articulation of the rotor blade 602 with the blade huh 604 changes the angle of attack of the articulating rotor blade 602 and accordingly increases or decreases the lift provided by the rotor blades 602. For instance, in one example, when a rapid ascent is specified the articulating rotor blades 602 are rotated into a corresponding configuration having a higher angle of attack to facilitate the rapid ascent of the towed atmospheric balloon system 100 to a specified altitude. In another example, where a rapid descent is desired, the articulating rotor blades 602 are conversely rotated by the blade hub 604 to a steep angle of attack to rapidly descend the towed atmospheric balloon system 100 to the specified altitude.

Figure 6B:
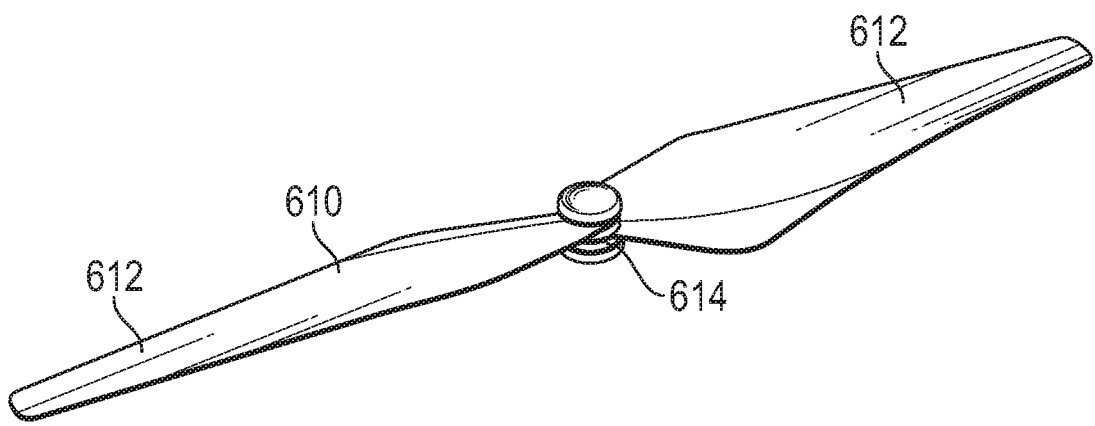
FIG. 6B is a perspective view of another example of a towing thruster.

FIG. 6B shows another example of a towing thruster 610. In this example, the towing thruster 610 includes rotor blades 612 fixedly coupled to a rotatable shaft 614. The rotor blades 612 accordingly maintain their orientation throughout operation of the towing thruster 610. In one example, the shaft 614 is coupled with the motor 206 shown in FIG. 2. Optionally, the motor 206 is operated in a unidirectional manner to rotate the rotor blades 612 in a corresponding manner. In some examples, the neutral buoyancy towing system 110 includes an articulating joint 208 (shown in FIG. 2) to orient the shaft 614 of the towing thruster 610 and thereby facilitate the upward and downward movement of the towed atmospheric balloon system 100 by redirecting the rotor blades 612 in an upward or downward fashion. In still other examples, the motor 206 is configured to operate in two directions including, for instance, clockwise and counterclockwise directions. In this example, the rotor blades 612 of the towing thrusters 610 are alternately rotated clockwise or counterclockwise to correspondingly increase or decrease altitude.

Figure 6C:
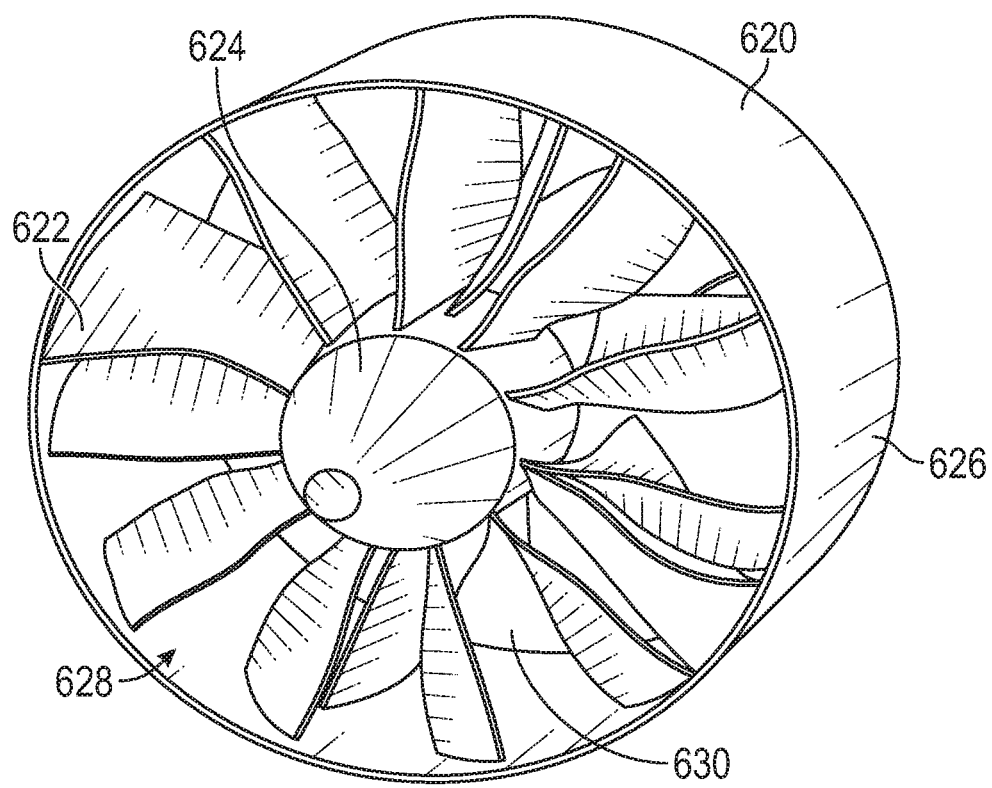
FIG. 6C is a perspective view of an additional example of a towing thruster.

FIG. 6C shows another example of a rotor configuration of a towing thruster 620. In this example, the towing thruster 620 includes a ducted fan. As shown, the towing thruster 620 includes a fan shroud 626, a shaft 624, and intervening rotor blades 622 extending between the shaft 624 and the fan shroud 626. As further shown in FIG. 6C, the towing thruster 620 includes an intake 628 and a discharge orifice 630 for gases such as atmosphere passed through the towing thruster 620. Optionally, the rotor blades 622 rotate independently from the fan shroud 626. In another example, the fan shroud 626 rotates with the rotor blades 622, for instance, the shaft 624, rotor blades 622 and the fan shroud 626 are a consolidated unit and thereby rotate in tandem relative to the shaft 624. As with the previously described rotors, the motor associated with the towing thruster 620 is, in one example, configured to operate in a single direction (clockwise or counterclockwise) or multi-directionally. In the unidirectional example, the neutral buoyancy towing system 110, including the towing thruster 620 includes an articulating joint 208 configured to direct the towing thruster 620 in one or more directions to increase or decrease altitude, provide lateral movement to the towed atmospheric balloon system 100, combinations of lateral and elevation movement or the like.

Figure 6D:
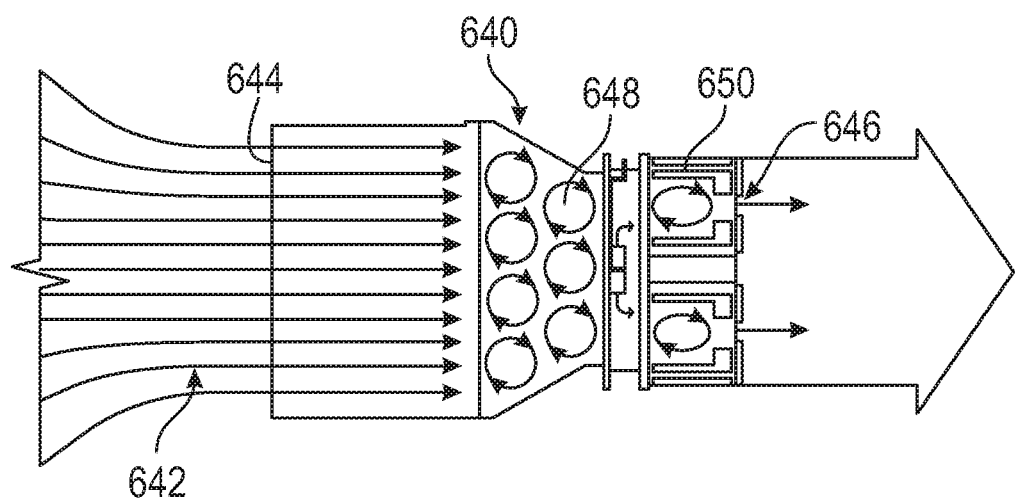
FIG. 6D is a perspective view of a supplemental example of a towing thruster.

FIG. 6D shows another example of a towing thruster 640. In this example, the towing thruster 640 includes an air breathing ion engine configured to receive atmosphere through an intake nozzle 644, ionize one or more elements, molecules or the like in the atmosphere 642 and discharge the atmosphere from the towing thruster 640 to provide one or more of altitude changes, lateral positioning (e.g., movement along the heading) or the like. As shown in FIG. 6D, the towing thruster 640 includes an intake 644 configured to receive atmosphere 642 therein. An ionization chamber 648 ionizes the atmosphere received in the towing thruster 640 and then passes the ionized atmosphere to a magnetic accelerator 650. The magnetic accelerator 650 accelerates the ionized particles through the discharge 646 and accordingly provides thrust by way of reaction forces from the discharged atmosphere.

Figure 7B:
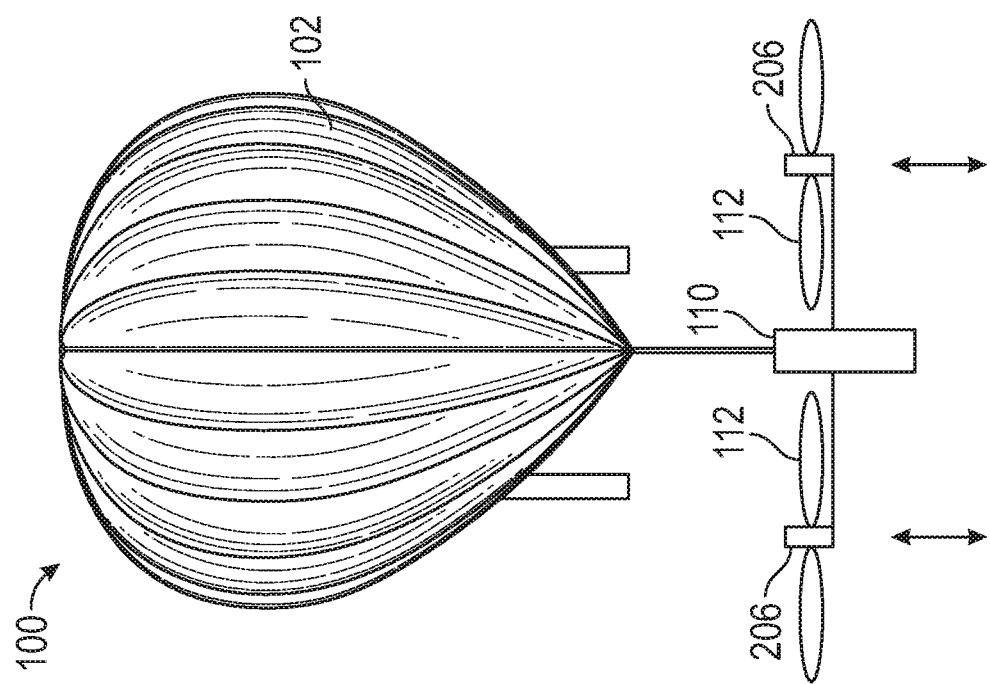
FIG. 7B is a schematic diagram of a towing system including a plurality of multi-directional rotors.
Figure 7A:
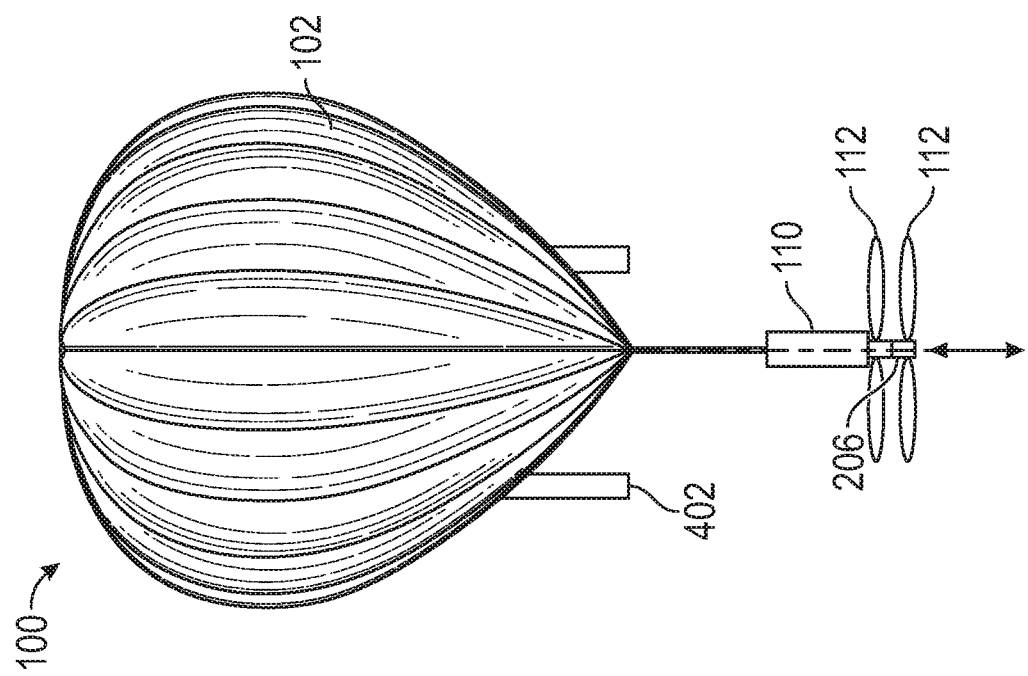
FIG. 7A is a schematic diagram of a towing system including a multi-directional rotor.

FIGS. 7A-D show arrangements of one or more towing thrusters 112 of the towed atmospheric balloon system 100 described herein. The one or more towing thrusters 112 shown in FIGS. 7A-1) include, but are not limited to, the example towing thrusters shown in FIGS. 6A-D. Referring first to FIG. 7A, the neutral buoyancy towing system 110 includes multiple towing thrusters 112. As shown, the towing thrusters 112 in this example are aligned, for instance with a vertical axis of the atmospheric balloon 102 (e.g., extending between the upper and lower apexes of the balloon). The towing thrusters 112 drive the balloon system 100 in one or more of altitude changes, lateral movement of the system or the like. Optionally, in an example including towing thrusters 112 having rotors the towing thrusters 112 are rotated in opposed directions (clockwise and counterclockwise) to minimize incidental rotation of the balloon system 100 caused by a reaction moment from the thrusters.

As further shown in FIG. 7A, the towing thrusters 112 are configured to ascend and descend the towed atmospheric balloon system 100. For instance, the towing thrusters 112 including rotors and one or more motors 206 are rotated in a first direction (e.g., clockwise) to ascend the system, and the rotors are rotated in a second opposed direction (e.g., counterclockwise) to descend the system. Optionally, with articulating rotors as shown in FIG. 6A, the rotors are angled to control angle of attack and thereby control the ascent and descent (e.g., velocity, acceleration or the like).

FIG. 7B shows another example of the neutral buoyancy towing system 110. In this example a plurality of towing thrusters 112 are provided along thruster booms spaced from the remainder of the system 110. For instance, the towing thrusters 112 are spaced from a vertical axis of the atmospheric balloon 102. In an example including rotors and motors 206 associated with the rotors of the thrusters 112, the rotors are operable for rotation in first and second opposed directions to ascend and descend the balloon system 100.

FIG. 7C includes the balloon system 100 with an example of the neutral buoyancy towing system 110 in multiple configurations. The towing system 110 includes one or more towing thrusters 112. As shown multiple towing thrusters 112 are provided along respective thruster booms (e.g., thruster booms 204 as shown in FIG. 2). In this example, the towing thrusters 112 are coupled with the thruster booms with one or more articulating joints 208. The articulating joints 208 are configured to orient the towing thrusters into one or more configurations including the configurations shown in the left and right portions of FIG. 7C.

Optionally, the motors 206 associated with the towing thrusters 112 are configured to rotate in a single direction. The articulating joints 208 orient the thrusters 112 into descending and ascending configurations (respectively shown in FIG. 7C). Accordingly, rotation of the towing thrusters 112 in the same direction in both configurations provides both of ascent and descent capabilities to the towed atmospheric balloon system 100.

Figure 7D:
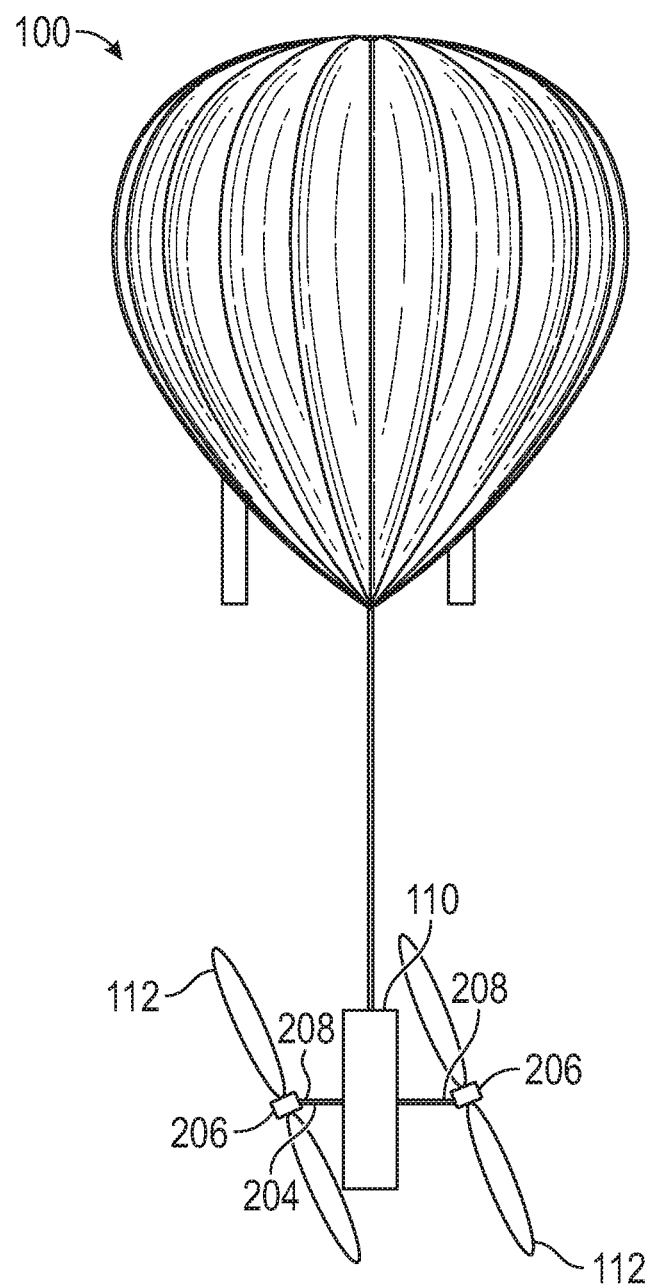
FIG. 7D is a schematic diagram of a towing system including a plurality of articulating rotors.

FIG. 7D) shows another example of the balloon system 100 having towing thrusters 112 configured for orientation. In this example, the towing thrusters 112 are configured for orientation into configurations that provide one or more of ascent, descent or lateral movement (e.g., movement along a heading) and combinations of the same. For example, the articulating joints 208 orient the towing thrusters 112 relative to the remainder of the balloon system 100. For instance, the articulating joints 208 are configured to orient the towing thrusters into multiple orientations including ascending and descending configurations (e.g., 180 degrees apart) and orientations therebetween (e.g., between 0 and 180 degrees, 0 and 360 degrees or the like) to facilitate lateral movement of the balloon system 100. In the example orientation shown in FIG. 7D the towing thrusters are oriented at approximately 115 degrees relative to horizontal. Operation of the towing thrusters in the example orientation accordingly includes vertical (upward or downward) and horizontal (lateral) components. Optionally, a control system, such as the control module 500 controls the orientation of the towing thrusters 112 (as a component of their operation) to modulate the magnitude of the vertical and horizontal components. Accordingly, altitude, speed, heading and the like are actively controlled with the control module 500.

Figure 8A:
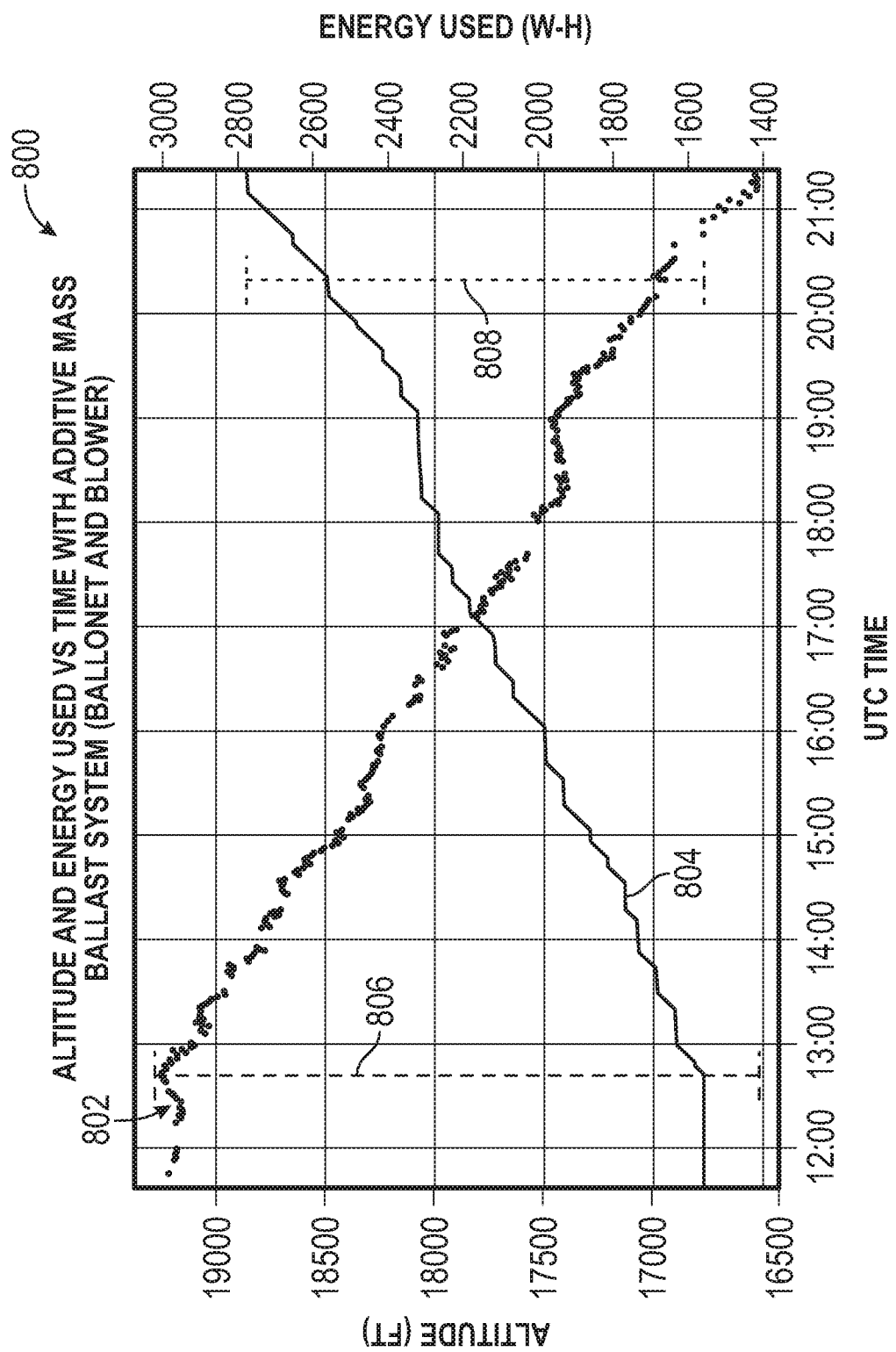
FIG. 8A is a plot showing energy usage of a balloon system including a ballast system during an altitude changing maneuver.
Figure 8B:
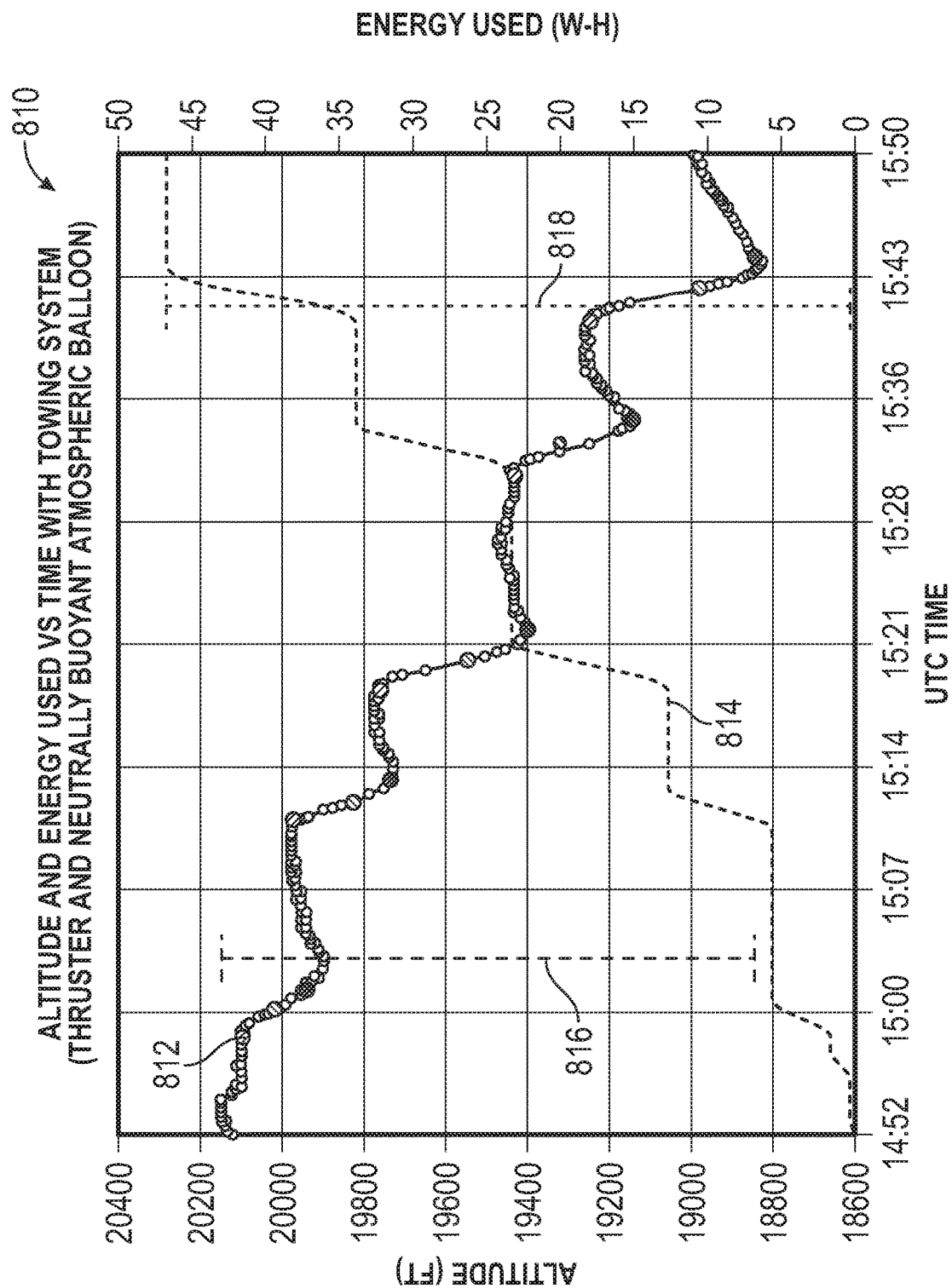
FIG. 8B is a plot showing energy usage of a neutrally buoyant atmospheric balloon system including a towing system during another altitude changing maneuver.

FIGS. 8A and 8B are corresponding altitude and energy plots 800, 810 illustrating energy used for one or more of the balloon systems described herein relative to a net altitude change. Referring first to FIG. 8A, one example of an altitude and energy plot 800 is provided for an altitude change using the balloon system 300 shown in FIG. 3A including, for example, a ballonet 308 and associated blower 310. The ballast system including the blower 310 is configured to fill the ballonet 308 with atmospheric gas or evacuate the ballonet 308 through a vent 312 (or through reverse operation of the blower 310).

As shown in FIG. 8A, with the altitude track 802, the balloon system 300 moves from an initial altitude of approximately 19,500 feet to a final altitude of approximately 16,500 feet. Accordingly, in this example, the balloon system 300, including the ballast system 311 including, for instance, the blower 310, shown in FIG. 3A, experiences a net altitude change 806 of approximately 3,000 feet.

On the converse energy track 804, the energy consumption for the balloon system 300 is shown while conducting the net altitude change 806. As shown in FIG. 8A, the energy track 804 generally trends up, for instance from an initial value of approximately 1500 watt hours to a final value of 2800 watt hours. Accordingly, the net energy 808 used to achieve the net altitude change 806 corresponds, in this example, to approximately 1300 watt hours. Stated another way the energy used by the blower 310 to deliver atmosphere into the ballonet 308, to decrease the buoyancy of the balloon system 300 and achieve the decreased altitude corresponds to a net 1300 watt hours. Optionally, upon achieving the lower altitude, the blower 310, in one example, operates in reverse (consuming more energy) or a vent such as the vent 312 is opened to facilitate the evacuation of at least a quantity of the atmosphere from the ballonet 308 and accordingly retain the balloon system 300 at, the specified altitude (e.g., approximately 16,500 feet).

FIG. 8B shows another altitude and energy plot 810 for the towed atmospheric balloon system 100 described herein and shown, for instance, in FIG. 1. In this example, the balloon system 100 follows an altitude track 812, for instance, starting at approximately 20,100 feet to a final altitude of approximately 18,800 feet or a net altitude change 816 of approximately 1300 feet. In a similar manner to the altitude and energy plot 800, the altitude and energy plot 810 of FIG. 8B includes an energy track 814 for the towed atmospheric balloon system 100 as the atmospheric balloon system moves between the altitudes.

In the example shown in FIG. 8B, the energy used, for instance, by the neutral buoyancy towing system 110 including the one or more towing thrusters 112 corresponds to the plot and energy track 814 shown in FIG. 8B. In this example, the energy track 814 begins at approximately 0 watt hours and as the net altitude change 816 is completed a total energy used is approximately 47 watt hours. Accordingly, the net energy 818 for achieving the altitude change 816 of approximately 1,300 feet corresponds to approximately 47 watt hours. In the example shown in FIG. 8B, with energy use of 47 watt hours (for an altitude change of 1300 feet) the neutral buoyancy towing system 110 uses two orders of magnitude less energy than the energy use of the corresponding ballast system 311 including a ballonet 308 and the associated blower 310. The towed atmospheric balloon system 100 is, in one example, a neutrally buoyant system and the neutral buoyancy system HO only moves the mass of the towed atmospheric balloon system 100 between altitudes, laterally or the like. Accordingly, because the system 100 is effectively weightless, the energy consumption for the one or more towing thrusters 112 of the towing system 110 is less than a neutrally or positively balloon system such as the balloon system 300 shown, for instance, in FIG. 3A.

Additionally, because the mass stays constant with the towed atmospheric balloon system 100, one or more consumable ballast components including, for instance, the ballast supply 330 shown with the zero pressure balloon system 320 in FIG. 3B are not used. Instead, the towed atmospheric balloon system 100 with the neutral buoyancy towing system 110 is configured to operate without a consumable mass or ballast system and is further configured to operate while neutrally buoyant thereby minimizing energy consumption while at the same time maintaining the overall mass of the system and thereby avoiding the need for one or more ballast systems used in other balloon systems.

Figure 9:
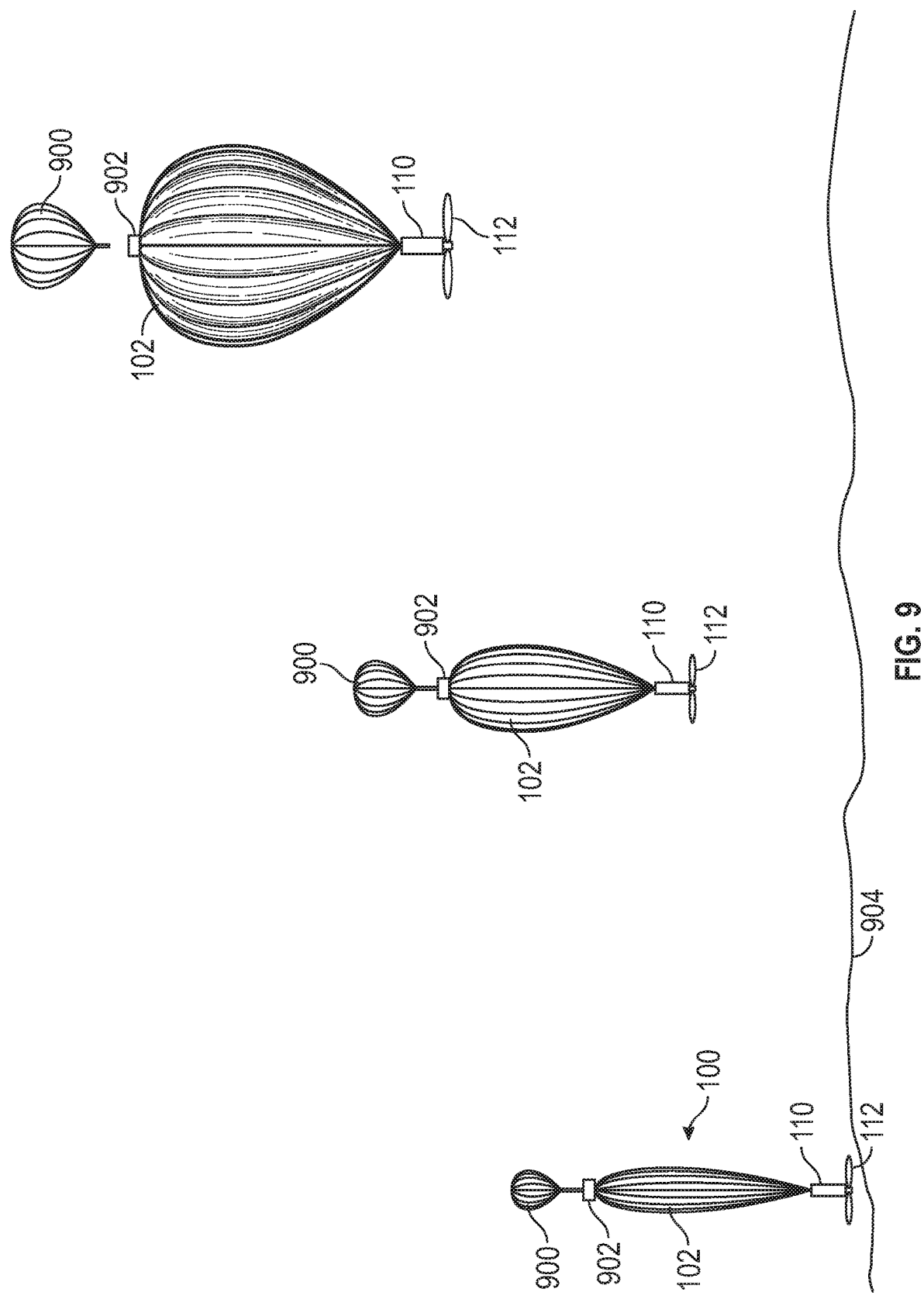
FIG. 9 is a schematic diagram of a neutrally buoyant atmospheric balloon system including a launch balloon at various altitudes.

FIG. 9 shows another example of the towed atmospheric balloon system 100 including a launch balloon 900 configured to assist the initial deployment of the towed atmospheric balloon system 100, for instance, to an initial or deployed altitude. Referring first to the left portion of FIG. 9, the towed atmospheric balloon system 100 is shown in a partially inflated configuration, for instance, with a quantity of lift gas provided to the atmospheric balloon 102. Additionally, the launch balloon 900 is shown coupled to the atmosphere balloon 102 with a release coupling 902. The launch balloon 900 is also filled with a quantity of lift gas and lifts or assists lifting of the towed atmospheric balloon system 100 to a specified altitude, for instance, an initial (deployment) altitude. The towed atmospheric balloon system 100 is itself, in one example, positively buoyant upon initial inflation or neutrally buoyant and the launch balloon 900, in such an example, provides additional positive buoyancy or the entirety of the positive buoyancy (e.g., collectively supplemental buoyancy) to lift the towed atmospheric balloon system 100 to the initial altitude.

As shown in the middle portion of FIG. 9, the atmospheric balloon 102 of the towed atmospheric balloon system 100 is at an intermediate height between the altitude and ground 904 and the initial (deployment) altitude of the towed atmospheric balloon system 100. As shown, the launch balloon 900 is expanded to a larger volume and the atmospheric balloon 102, including its own quantity of lift gas, is also expanded and has a greater volume relative to the balloon 102 shown in the first portion of the diagram in FIG. 9. The launch balloon 900 continues to provide lift assistance to the towed atmospheric balloon system 100 to accordingly accelerate delivery of the towed atmospheric balloon system 100 to a specified initial altitude.

As further shown in FIG. 9, in the right portion of the diagram, the atmospheric balloon 102 is shown at an initial deployment altitude. In this example, the atmospheric balloon 102 includes an initial volume corresponding to an intermediate volume between the maximum fill volume and minimum or evacuated volume of the atmospheric balloon 102. At this altitude, the launch balloon 900 is optionally released, for instance, by way of an operable release coupling 902. The release coupling 902 includes, in one example, an actuated blade, frangible bolt, release clamp or the like configured to release the launch balloon 900 and decouple the launch balloon 900 from the remainder of the towed atmospheric balloon system 100. At the initial altitude, the towed atmospheric balloon system 100, in one example, releases any additional extra lift gas provided within the atmospheric balloon 102 (thereafter having a substantially static mass quantity of lift gas) and remains at the initial altitude until, for instance, operation of the towing thruster 112 of the neutral buoyancy towing system 110 moves the neutrally buoyant atmospheric balloon 102 to one or more different altitudes, laterally or the like.

Optionally, the atmospheric balloon 102 is filled with a quantity of lift gas configured to provide neutral buoyancy to the towed atmospheric balloon system 100. Accordingly, in this example, the launch balloon 900 provides additional lift and positive buoyancy to the towed atmospheric balloon system 100 to facilitate positioning of the towed atmospheric balloon system 100 at one or more specified initial altitudes. As shown on the right portion of FIG. 9, in this example, the launch balloon 900 with the quantity of lift gas configured to provide a positive buoyancy decouples with the release coupling 902 from the towed atmospheric balloon system at the initial altitude. In this configuration, the launch balloon 900 provides the entirety of lift to the towed atmospheric balloon system 100. Accordingly, lift gas, for instance, in the atmospheric balloon 102 is not vented. Instead, at release of the launch balloon 900 the neutrally buoyant atmospheric balloon 102 suspends the towed atmospheric balloon system 100 of the launch balloon 900 at the initial specified altitude.

FIG. 10 shows one example of a method 1000 for towing an atmospheric balloon system, such as the balloon system 100 described herein. In describing the method 1000 reference is made to one or more components, features, functions, steps or the like described herein. Where convenient reference is made to the components, features, functions, steps or the like with reference numerals. Reference numerals provided are exemplary and are not exclusive. For instance, the features, components, functions, steps and the like described in the method 1000 include, but are not limited to, the corresponding numbered elements, other corresponding features described herein, both numbered and unnumbered as well as their equivalents.

At 1002, the atmospheric balloon system 100 is positioned at an initial altitude. For example, the system 100 begins at an altitude corresponding to a specified launch altitude. The atmospheric balloon system 100 includes an atmospheric balloon 102 having a quantity of lift gas and a dynamic balloon volume. The atmospheric balloon 102 with the lift gas is neutrally buoyant, and configured to change its volume to maintain neutral buoyancy while moving between various altitudes.

At 1004 the atmospheric balloon system is towed with a neutral buoyancy towing system 110 having at least one towing thruster 112. As described herein, the towing thrusters apply force to the neutrally buoyant balloon system 100 and thereby readily move the system between altitudes, laterally or the like. Because the balloon system 100 is effectively weightless (e.g., nominally weightless with variations from temperature, leaking of lift gas or the like) the one or more towing thrusters 112 require minimal energy (as shown in FIG. 8B) in contrast to other ballast systems, such as ballonets and blowers used in super pressure balloon systems 300 (as shown in FIG. 8A).

Towing includes, at 1006, driving the atmospheric balloon system 100 from a first altitude to a second altitude with the one or more towing thrusters 112. In this example, the first and second altitudes are different. In other examples, driving balloon system 100 includes movement in one or more orientations, for instance, laterally (horizontally), vertical or combinations of the same, for instance with articulation or change in rotation of the towing thrusters 112.

At 1008, the dynamic balloon volume of the atmospheric balloon 102 changes while driving from the first altitude to the second altitude. For instance, the mass of the lift gas remains constant (aside from leaking or potential venting if overfilled) in an operational configuration (e.g., after initial ascent) and the gas expands and contracts as the balloon ascends or descends. The weight of the atmosphere displaced by the dynamically changing balloon volume of the atmospheric balloon 102 matches the weight of the atmospheric balloon system. 100 and thereby maintains neutral buoyancy, as shown at 1010 of FIG. 10. Further, because the quantity of lift gas is static (aside from leaking or venting if overfilled) and the towed atmospheric balloon system 100 is neutrally buoyant, ballast systems that add and subtract mass are not used. Instead, at 1012 the composite mass of the system 100 including the mass of the lift gas, atmospheric balloon 102, payload 108 and the neutrally buoyant towing system 100 is static during operation of the system 100 (e.g., during changes in altitude).

Several options for the method 1000 follow. In one example, maintaining neutral buoyancy of the atmospheric balloon system 100 while driving from the first altitude to the second altitude includes maintaining neutral buoyancy throughout towing of the atmospheric balloon system 100, for instance throughout the operational lifetime of the system. Further, because the system 100 uses a neutrally buoyant towing system 100 instead of a ballast system that adds and subtracts mass power requirements are minimized, ballast supplies are not exhausted and the system 100 remains operational for significant periods (e.g., 100 days or more, 200 days or, 400 days or more or the like).

In another example, positioning the atmospheric balloon system 100 at the initial altitude, such as a deployment altitude includes filling the atmospheric balloon 102 with a first quantity (mass) of lift gas to a launch volume. The launch volume is less than the maximum filled volume of the balloon 102. The system 100 including the partially filled atmospheric balloon 102 ascends to the initial altitude with the first quantity of lift gas and a dynamic balloon volume larger than the launch volume because of expansion commensurate with the less dense (lower pressure) atmosphere at higher altitudes. The first mass of lift gas is static from launch through towing of the atmospheric balloon system. Optionally, the first mass of lift gas is partially vented at an initial altitude to arrest further (initially positively buoyant) ascent. The remaining lift gas mass is thereafter static (aside from potential leaking). Conversely, the balloon volume is dynamic and changes according to changes in altitude. For example, when driven with the neutral buoyancy towing system 100 to ascend, the atmospheric balloon with the static mass of lift gas continues to expand to a full volume. In some examples, maximum neutral buoyancy altitude is approximately 130,000 feet depending on the mass of lift gas used, the maximum volume of the balloon 102 and the weight of other components. As the towing system 100 initiates descent, the atmospheric balloon contracts and decreases in volume while still maintaining neutral buoyancy. In one example, a minimum altitude for the towed atmospheric balloon system 100 includes 30,000 feet, 40,000 feet, 50,000 feet or the like. At these lower altitudes the density of air and wind currents in some examples fold and twist the atmospheric balloon and frustrate maintenance of the balloon at altitude even with neutral buoyancy.

In still another example, towing the atmospheric balloon system 100 includes driving the atmospheric balloon system laterally, for instance horizontally or both horizontally and vertically. For instance, towing thrusters 112 coupled with the system 100 with one or more articulating joints 208 are oriented to control heading and elevation (see FIG. 7D). In one example, towing the atmospheric balloon system 100 includes orienting the at least one towing thruster 112 between elevator and translation configurations. In the elevator configuration the at least one towing thruster 112 is oriented to drive the atmospheric balloon system from the first altitude to the second altitude. In the translation configuration the at least one towing thruster 112 is oriented to drive the atmospheric balloon system laterally. Optionally, towing the atmospheric balloon system 100 includes driving the atmospheric balloon system from the second altitude to the first altitude after one or more of orienting the at least one towing thruster 112 from a first orientation to a second orientation (see FIG. 7C) or reversing rotation of a rotor of the at least one towing thruster 112 (see FIGS. 7A, B).

Optionally, towing the atmospheric balloon system 100 includes driving the atmospheric balloon system, such as the atmospheric balloon 102 out of a heated ambient atmosphere envelope surrounding the atmospheric balloon. In some examples, heating and cooling of the atmospheric balloon, for instance during day and night transitions, through heating during the day or the like heats the balloon membrane and conductively and convectively heats the atmosphere surrounding the balloon. In some examples, the heating and cooling corresponding expands or contracts the lift gas thereby changing the volume and buoyancy of the system 100. The method 1000 optionally includes actively moving the otherwise neutrally buoyant balloon system 100 out of the thermal envelope (e.g., with lateral, vertical towing or the like) to minimize uncontrolled heating and cooling with volume changes, and maintain the specified buoyancy and a specified altitude.

In still other examples positioning the atmospheric balloon system 100 at the initial altitude includes lifting the atmospheric balloon system to the initial altitude with a launch balloon 900 different than the atmospheric balloon. The launch balloon 900 is then decoupled from the atmospheric balloon 102 at the initial altitude, such as an initial deployment altitude, with a release coupling 902.

VARIOUS NOTES & ASPECTS

Aspect 1 can include subject matter such as a towed atmospheric balloon system comprising: an atmospheric balloon including a quantity of lift gas therein; and a neutral buoyancy towing system coupled with the atmospheric balloon, the neutral buoyancy towing system includes: a towing thruster configured to move the towed atmospheric balloon system in a neutrally buoyant condition between altitudes; and a power source operatively coupled with the towing thruster; and wherein a composite mass of the towed atmospheric balloon system includes component masses of the atmospheric balloon and the neutral buoyancy towing system, and the composite mass is static and neutral buoyancy are maintained with movement between altitudes.

Aspect 2 can include, or can optionally be combined with the subject matter of Aspect 1, to optionally include wherein the atmospheric balloon includes a dynamic volume that changes between altitudes while the composite mass is static and neutral buoyancy is maintained.

Aspect 3 can include, or can optionally be combined with the subject matter of one or any combination of Aspects 1 or 2 to optionally include wherein the towing thruster configured to move the towed atmospheric balloon system is configured to drive the towed atmospheric balloon system between altitudes.

Aspect 4 can include, or can optionally be combined with the subject matter of one or any combination of Aspects 1-3 to optionally include wherein the towing thruster includes one or more rotors.

Aspect 5 can include, or can optionally be combined with the subject matter of one or any combination of Aspects 1-4 to optionally include wherein the one or more rotors include one or more respective rotor axes, and the one or more respective rotor axes are in a corresponding orientation with a vertical axis of the atmospheric balloon.

Aspect 6 can include, or can optionally be combined with the subject matter of Aspects 1-5 to optionally include wherein the power source includes an electric motor and one or more of a battery or a photoelectric cell.

Aspect 7 can include, or can optionally be combined with the subject matter of Aspects 1-6 to optionally include wherein the towing thruster consists of at least one of a rotor, propeller, or ducted fan.

Aspect 8 can include, or can optionally be combined with the subject matter of Aspects 1-7 to optionally include wherein the towing thruster is configured for orientation into at least an elevator configuration and translation configuration, in the elevator configuration the towing thruster is configured to drive the towed atmospheric balloon system between altitudes in the neutrally buoyant condition; and in the translation configuration the towing thruster is configured to drive the towed atmospheric balloon system laterally.

Aspect 9 can include, or can optionally be combined with the subject matter of Aspects 1-8 to optionally include wherein the atmospheric balloon is in a sealed configuration with the quantity of lift gas.

Aspect 10 can include, or can optionally be combined with the subject matter of Aspects 1-9 to optionally include wherein the quantity of lift gas is a static quantity of lift gas, and the atmospheric balloon is in the sealed configuration with the static quantity of lift gas from a launch configuration through an operational configuration.

Aspect 11 can include, or can optionally be combined with the subject matter of Aspects 1-10 to optionally include a launch balloon coupled with the remainder of the towed atmospheric balloon system, and the launch balloon is configured to lift the towed atmospheric balloon system to a specified altitude.

Aspect 12 can include, or can optionally be combined with the subject matter of Aspects 1-11 to optionally include a release coupling between the launch balloon and the towed atmospheric balloon system.

Aspect 13 can include, or can optionally be combined with the subject matter of Aspects 1-12 to optionally include a towed atmospheric balloon system comprising: an atmospheric balloon including a quantity of lift gas therein; and a neutral buoyancy towing system coupled with the atmospheric balloon, the neutral buoyancy towing system includes: a towing thruster; and wherein the atmospheric balloon is configured for towed movement between a plurality of altitudes including at least first and second altitudes: at the first altitude the towed atmospheric balloon system has a first composite mass and is neutrally buoyant; the towing thruster is configured to move the towed atmospheric balloon system from the first altitude to at least the second altitude through towing movement; and at the second altitude the towed atmospheric balloon system is neutrally buoyant and has a second composite mass matching the first composite mass.

Aspect 14 can include, or can optionally be combined with the subject matter of Aspects 1-13 to optionally include wherein the atmospheric balloon has a first volume at the first altitude and a second volume at the second altitude different from the first volume.

Aspect 15 can include, or can optionally be combined with the subject matter of Aspects 1-14 to optionally include wherein the towing thruster configured to move the towed atmospheric balloon system is configured to drive the towed atmospheric balloon system between the plurality of altitudes.

Aspect 16 can include, or can optionally be combined with the subject matter of Aspects 1-15 to optionally include wherein the towing thruster includes at least one rotor, and the neutral buoyancy towing system includes: a motor operatively coupled with the at least one rotor; and one or more of a battery or a photoelectric cell.

Aspect 17 can include, or can optionally be combined with the subject matter of Aspects 1-16 to optionally include wherein the towing thruster consists of at least one of a rotor, propeller, or ducted fan.

Aspect 18 can include, or can optionally be combined with the subject matter of Aspects 1-17 to optionally include wherein the towing thruster is configured for orientation into at least an elevator configuration and a translation configuration, in the elevator configuration the towing thruster is configured to drive the towed atmospheric balloon system between altitudes of the plurality of altitudes; and in the translation configuration the towing thruster is configured to drive the towed atmospheric balloon system laterally.

Aspect 19 can include, or can optionally be combined with the subject matter of Aspects 1-18 to optionally include wherein the atmospheric balloon includes a lift gas vent, the lift gas vent configured to vent lift gas upon achieving a specified altitude for an operational configuration.

Aspect 20 can include, or can optionally be combined with the subject matter of Aspects 1-19 to optionally include wherein the lift gas vent is configured to close at the specified altitude in the operational configuration, and the quantity of lift gas is a static quantity of lift gas in the operational configuration including each of the first and second altitudes.

Aspect 21 can include, or can optionally be combined with the subject matter of Aspects 1-20 to optionally include a method for towing an atmospheric balloon system comprising: positioning the atmospheric balloon system at an initial altitude, the atmospheric balloon system includes an atmospheric balloon having: a quantity of lift gas; and a dynamic balloon volume; and towing the atmospheric balloon system with a neutral buoyancy towing system including at least one towing thruster, towing includes: driving the atmospheric balloon system from a first altitude to a second altitude with a force from the at least one towing thruster, the first altitude different from the second altitude; changing the dynamic balloon volume while driving from the first altitude to the second altitude; maintaining neutral buoyancy of the atmospheric balloon system while driving from the first altitude to the second altitude; and maintaining a static composite mass of the atmospheric balloon system while driving from the first altitude to the second altitude.

Aspect 22 can include, or can optionally be combined with the subject matter of Aspects 1-21 to optionally include wherein maintaining neutral buoyancy of the atmospheric balloon system while driving from the first altitude to the second altitude includes maintaining neutral buoyancy throughout towing of the atmospheric balloon system.

Aspect 23 can include, or can optionally be combined with the subject matter of Aspects 1-22 to optionally include wherein positioning the atmospheric balloon system at the initial altitude includes: filling the atmospheric balloon with a first quantity of lift gas to a launch volume; and ascending to the initial altitude with the first quantity of lift gas and the dynamic balloon volume larger than the launch volume.

Aspect 24 can include, or can optionally be combined with the subject matter of Aspects 1-23 to optionally include wherein the first quantity of lift gas includes a first mass of lift gas, and the first mass of lift gas is static from launch through towing of the atmospheric balloon system.

Aspect 25 can include, or can optionally be combined with the subject matter of Aspects 1-24 to optionally include wherein towing the atmospheric balloon system includes driving the atmospheric balloon system laterally.

Aspect 26 can include, or can optionally be combined with the subject matter of Aspects 1-25 to optionally include wherein towing the atmospheric balloon system includes orienting the at least one towing thruster between elevator and translation configurations; in the elevator configuration the at least one towing thruster is oriented to drive the atmospheric balloon system from the first altitude to the second altitude; and in the translation configuration the at least one towing thruster is oriented to drive the atmospheric balloon system laterally.

Aspect 27 can include, or can optionally be combined with the subject matter of Aspects 1-26 to optionally include wherein towing the atmospheric balloon system includes driving the atmospheric balloon system from the second altitude to the first altitude after one or more of orienting the at least one towing thruster from a first orientation to a second orientation or reversing rotation of a rotor of the at least one towing thruster.

Aspect 28 can include, or can optionally be combined with the subject matter of Aspects 1-27 to optionally include wherein towing the atmospheric balloon system includes driving the atmospheric balloon system out of a heated ambient atmosphere envelope around the atmospheric balloon.

Aspect 29 can include, or can optionally be combined with the subject matter of Aspects 1-28 to optionally include wherein driving the atmospheric balloon system from the first altitude to the second altitude with force from the at least one towing thruster including driving the atmospheric balloon system from a first altitude of 30,000 feet to a second altitude of 130,000 feet while maintaining neutral buoyancy and the static composite mass.

Aspect 30 can include, or can optionally be combined with the subject matter of Aspects 1-29 to optionally include wherein positioning the atmospheric balloon system at the initial altitude includes: lifting the atmospheric balloon system to the initial altitude with a launch balloon different than the atmospheric balloon; and decoupling the launch balloon from the atmospheric balloon at the initial altitude.

Aspect 31 can include, or can optionally be combined with the subject matter of Aspects 1-30 to optionally include maintaining the quantity of lift gas static in an operational configuration including the initial altitude and at least the first and second altitudes.

Each of these non-limiting aspects can stand on its own, or can be combined in various permutations or combinations with one or more of the other aspects.

The above detailed description includes references to the accompanying drawings, which form a part of the detailed description. The drawings show, by way of illustration, specific embodiments in which the disclosure can be practiced. These embodiments are also referred to herein as "examples," Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the disclosure should be determined with reference to the appended claims, along with the full scope of equivalents to which such claims are entitled.

What is claimed is:
1. A towed atmospheric balloon system comprising:
an atmospheric balloon including a quantity of lift gas therein;
a neutral buoyancy towing system coupled with the atmospheric balloon, the neutral buoyancy towing system includes:
a towing thruster configured to move the towed atmospheric balloon system in a neutrally buoyant condition between altitudes; and
a power source operatively coupled with the towing thruster;
wherein a composite mass of the towed atmospheric balloon system includes component masses of the atmospheric balloon and the neutral buoyancy towing system, and the composite mass is static and neutral buoyancy are maintained with movement between altitudes; and wherein the atmospheric balloon includes a dynamic volume that changes between altitudes while the composite mass is static and neutral buoyancy is maintained.

2. The towed atmospheric balloon system of claim 1, wherein the towing thruster configured to move the towed atmospheric balloon system is configured to drive the towed atmospheric balloon system between altitudes.

3. The towed atmospheric balloon system of claim 1, wherein the power source includes an electric motor and one or more of a battery or a photoelectric cell.

4. The towed atmospheric balloon system of claim 1, wherein the towing thruster consists of at least one of a rotor, propeller, or ducted fan.

5. The towed atmospheric balloon system of claim 1, wherein the towing thruster is configured for orientation into at least an elevator configuration and translation configuration,
in the elevator configuration the towing thruster is configured to drive the towed atmospheric balloon system between altitudes in the neutrally buoyant condition; and
in the translation configuration the towing thruster is configured to drive the towed atmospheric balloon system laterally.

6. The towed atmospheric balloon system of claim 1, wherein the towing thruster includes one or more rotors.

7. The towed atmospheric balloon system of claim 6, wherein the one or more rotors include one or more respective rotor axes, and the one or more respective rotor axes are in a corresponding orientation with a vertical axis of the atmospheric balloon.

8. The towed atmospheric balloon system of claim 1, wherein the atmospheric balloon is in a sealed configuration with the quantity of lift gas.

9. The towed atmospheric balloon system of claim 8, wherein the quantity of lift gas is a static quantity of lift gas, and the atmospheric balloon is in the sealed configuration with the static quantity of lift gas from a launch configuration through an operational configuration.

10. The towed atmospheric balloon system of claim 8 comprising a launch balloon coupled with the remainder of the towed atmospheric balloon system, and the launch balloon is configured to lift the towed atmospheric balloon system to a specified altitude.

11. The towed atmospheric balloon system of claim 10 comprising a release coupling between the launch balloon and the towed atmospheric balloon system.

12. A towed atmospheric balloon system comprising:
an atmospheric balloon including a quantity of lift gas therein; and
a neutral buoyancy towing system coupled with the atmospheric balloon, the neutral buoyancy towing system includes:
a towing thruster; and
wherein the atmospheric balloon is configured for towed movement between a plurality of altitudes including at least first and second altitudes:
at the first altitude the towed atmospheric balloon system has a first composite mass, a first volume and is neutrally buoyant;
the towing thruster is configured to move the towed atmospheric balloon system from the first altitude to at least the second altitude through towing movement; and
at the second altitude the towed atmospheric balloon system is neutrally buoyant, has a second volume different than the first volume, and has a second composite mass matching the first composite mass.

13. The towed atmospheric balloon system of claim 12, wherein the towing thruster configured to move the towed atmospheric balloon system is configured to drive the towed atmospheric balloon system between the plurality of altitudes.

14. The towed atmospheric balloon system of claim 12, wherein the towing thruster includes at least one rotor, and the neutral buoyancy towing system includes:
a motor operatively coupled with the at least one rotor; and
one or more of a battery or a photoelectric cell.

15. The towed atmospheric balloon system of claim 12, wherein the towing thruster consists of at least one of a rotor, propeller, or ducted fan.

16. The towed atmospheric balloon system of claim 12, wherein the towing thruster is configured for orientation into at least an elevator configuration and a translation configuration,
in the elevator configuration the towing thruster is configured to drive the towed atmospheric balloon system between altitudes of the plurality of altitudes; and
in the translation configuration the towing thruster is configured to drive the towed atmospheric balloon system laterally.

17. The towed atmospheric balloon system of claim 12, wherein the atmospheric balloon includes a lift gas vent, the lift gas vent configured to vent lift gas upon achieving a specified altitude for an operational configuration.

18. The towed atmospheric balloon system of claim 17, wherein the lift gas vent is configured to close at the specified altitude in the operational configuration, and the quantity of lift gas is a static quantity of lift gas in the operational configuration including each of the first and second altitudes.

19. A method for towing an atmospheric balloon system comprising:
positioning the atmospheric balloon system at an initial altitude, the atmospheric balloon system includes an atmospheric balloon having:
a quantity of lift gas; and
a dynamic balloon volume; and
towing the atmospheric balloon system with a neutral buoyancy towing system including at least one towing thruster, towing includes:
driving the atmospheric balloon system from a first altitude to a second altitude with a force from the at least one towing thruster, the first altitude different from the second altitude;
changing the dynamic balloon volume while driving from the first altitude to the second altitude;
maintaining neutral buoyancy of the atmospheric balloon system while driving from the first altitude to the second altitude; and
maintaining a static composite mass of the atmospheric balloon system while driving from the first altitude to the second altitude.

20. The method of claim 19, wherein maintaining neutral buoyancy of the atmospheric balloon system while driving from the first altitude to the second altitude includes maintaining neutral buoyancy throughout towing of the atmospheric balloon system.

21. The method of claim 19, wherein towing the atmospheric balloon system includes driving the atmospheric balloon system laterally.

22. The method of claim 19, wherein towing the atmospheric balloon system includes orienting the at least one towing thruster between elevator and translation configurations:
in the elevator configuration the at least one towing thruster is oriented to drive the atmospheric balloon system from the first altitude to the second altitude; and
in the translation configuration the at least one towing thruster is oriented to drive the atmospheric balloon system laterally.

23. The method of claim 19, wherein towing the atmospheric balloon system includes driving the atmospheric balloon system from the second altitude to the first altitude after one or more of orienting the at least one towing thruster from a first orientation to a second orientation or reversing rotation of a rotor of the at least one towing thruster.

24. The method of claim 19, wherein towing the atmospheric balloon system includes driving the atmospheric balloon system out of a heated ambient atmosphere envelope around the atmospheric balloon.

25. The method of claim 19, wherein driving the atmospheric balloon system from the first altitude to the second altitude with force from the at least one towing thruster including driving the atmospheric balloon system from a first altitude of 30,000 feet to a second altitude of 130,000 feet while maintaining neutral buoyancy and the static composite mass.

26. The method of claim 19, wherein positioning the atmospheric balloon system at the initial altitude includes:
filling the atmospheric balloon with a first quantity of lift gas to a launch volume; and
ascending to the initial altitude with the first quantity of lift gas and the dynamic balloon volume larger than the launch volume.

27. The method of claim 26, wherein the first quantity of lift gas includes a first mass of lift gas, and the first mass of lift gas is static from launch through towing of the atmospheric balloon system.

28. The method of claim 19, wherein positioning the atmospheric balloon system at the initial altitude includes:
lifting the atmospheric balloon system to the initial altitude with a launch balloon different than the atmospheric balloon; and
decoupling the launch balloon from the atmospheric balloon at the initial altitude.

29. The method of claim 28 comprising maintaining the quantity of lift gas static in an operational configuration including the initial altitude and at least the first and second altitudes.

* * * * *